United States Patent
Takahashi et al.

(10) Patent No.: US 12,224,598 B2
(45) Date of Patent: Feb. 11, 2025

(54) WIRELESS POWER TRANSMISSION SYSTEM

(71) Applicant: DENSO CORPORATION, Kariya (JP)

(72) Inventors: Masaya Takahashi, Kariya (JP); Mitsuru Shibanuma, Kariya (JP); Kazuyuki Kato, Kariya (JP); Yusei Nakayashiki, Kariya (JP); Eisuke Takahashi, Kariya (JP); Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/232,690

(22) Filed: Aug. 10, 2023

(65) Prior Publication Data

US 2023/0387723 A1 Nov. 30, 2023

Related U.S. Application Data

(63) Continuation of application No. PCT/JP2022/004229, filed on Feb. 3, 2022.

(30) Foreign Application Priority Data

Feb. 25, 2021 (JP) .................................. 2021-028217
Jan. 24, 2022 (JP) .................................. 2022-008670

(51) Int. Cl.
*H02J 50/12* (2016.01)
*B60L 53/39* (2019.01)
*H02J 50/40* (2016.01)
*H02J 50/90* (2016.01)

(52) U.S. Cl.
CPC .............. *H02J 50/12* (2016.02); *B60L 53/39* (2019.02); *H02J 50/40* (2016.02); *H02J 50/90* (2016.02)

(58) Field of Classification Search
CPC .. H02J 50/12; H02J 50/90; H02J 50/40; H02J 53/39
See application file for complete search history.

(56) References Cited

U.S. PATENT DOCUMENTS 6,317,338 B1    11/2001  Boys
2013/0015699 A1  1/2013  Mita

FOREIGN PATENT DOCUMENTS

JP    2016-101079 A    5/2016
JP    2021-023094 A    2/2021

OTHER PUBLICATIONS

Jun Yamada et al.; "Circuit Analysis and Characterization of Contactless Power Transfer System with Variable Impedance"; IEEJ Transactions on Industry Applications; 2017; vol. 137; No. 11; pp. 815-826.

*Primary Examiner* — Robert L Deberadinis
(74) *Attorney, Agent, or Firm* — Oliff PLC

(57) ABSTRACT

A wireless power transmission system is provided which wirelessly transfer electric power from a power transmitter to a power receiver. The wireless power transmission system works to set a capacitance of a primary capacitor of a primary resonant circuit to undergo resonance with a self-inductance of a primary coil at an angular frequency that is an operating frequency. A tertiary capacitor of a tertiary resonant circuit has a capacitance set to undergo resonance with a self-inductance of a tertiary coil. A secondary capacitor of a secondary resonant circuit has a capacitance set to reduce a reactive component of ac power arising from self-inductances and mutual inductances of the primary coil, the secondary coil, and the tertiary coil.

13 Claims, 12 Drawing Sheets

$$C1 = \frac{1}{\omega 0^2 \cdot L1}$$

$$C3 = \frac{1}{\omega 0^2 \cdot L3}$$

$$C2 = \frac{1}{\omega 0^2 \left[ L2 - \frac{2 \cdot M12 \cdot M32}{M13} \right]}$$

$$= \frac{1}{\omega 0^2 \cdot L2 \left[ 1 - \frac{2 \cdot k12 \cdot k32}{k13} \right]}$$

$$M12 = k12 \cdot \sqrt{L1 \cdot L2}$$
$$M13 = k13 \cdot \sqrt{L1 \cdot L3}$$
$$M32 = k32 \cdot \sqrt{L3 \cdot L2}$$

$$C1 = \frac{1}{\omega 0^2 \cdot L1}$$

$$C2 = \frac{1}{\omega 0^2 \left[ L2 - \frac{2 \cdot M12 \cdot M32}{L3 + M13} - \frac{M32^2 \cdot L3}{(L3+M13)^2} \right]}$$

$$C3 = \frac{1}{\omega 0^2 \cdot L3}$$

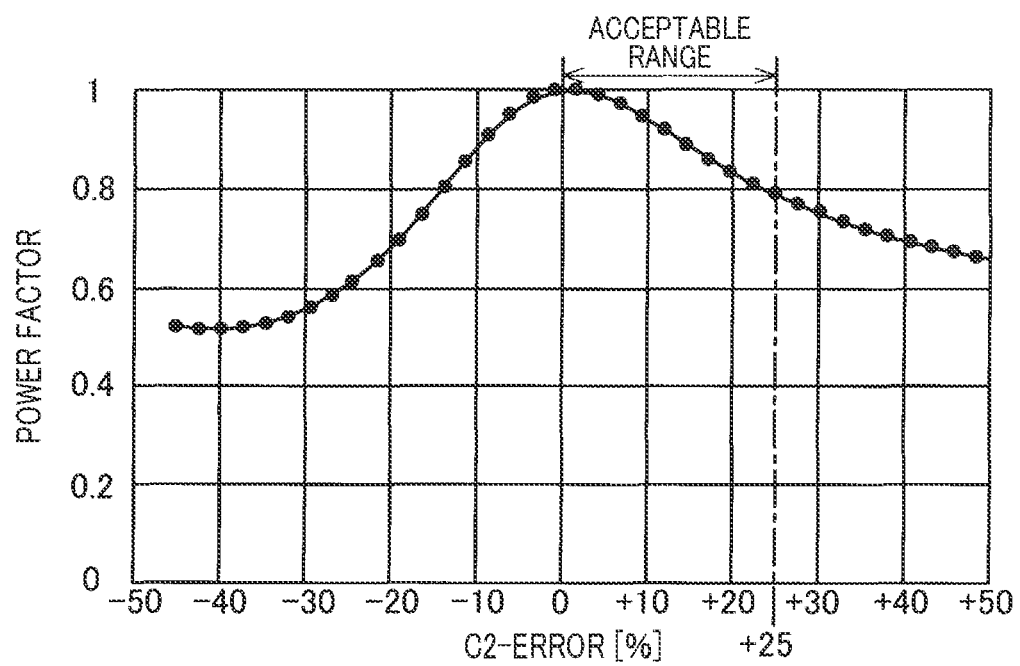

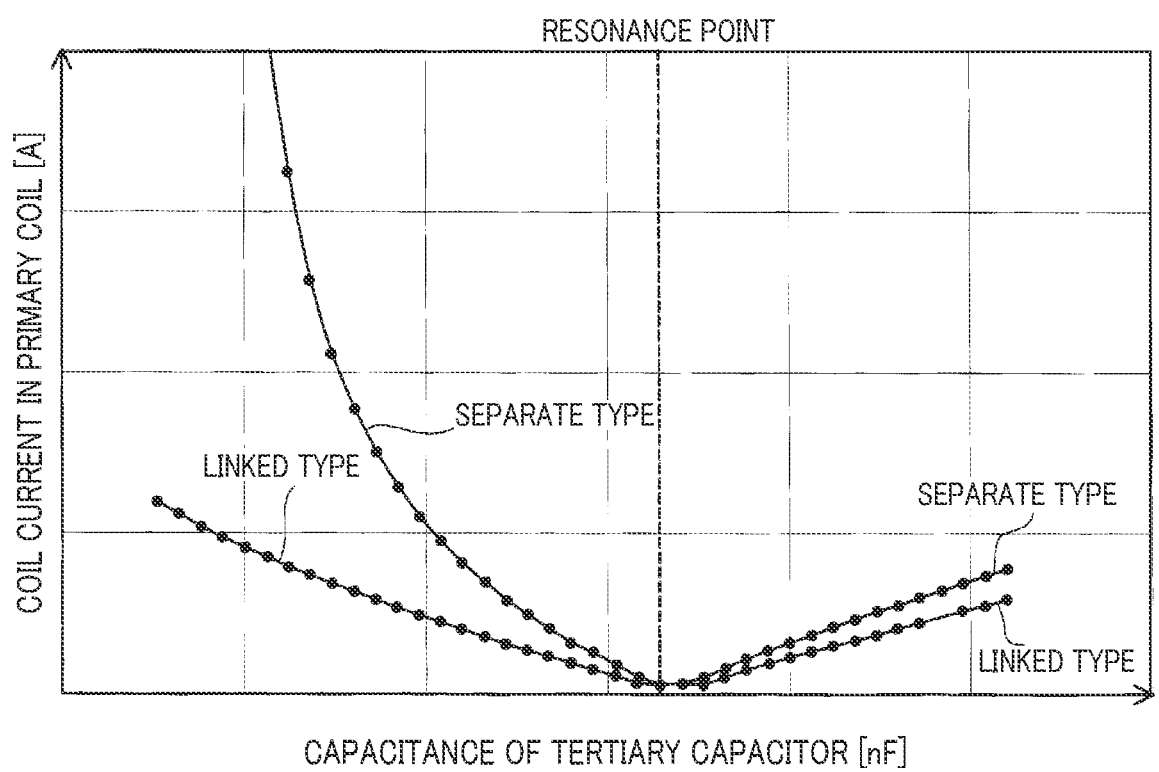

| | Sd | C1c | C3c |
|---|---|---|---|
| ABSENCE OF POWER RECEIVER : | L | Cs1<Cl1<C1 | Cs3<Cl3<C3 |
| PRESENCE OF POWER RECEIVER : | H | C1=Cl1+Cs1 | C3=Cl3+Cs3 |

WIRELESS POWER TRANSMISSION SYSTEM

CROSS REFERENCE TO RELATED DOCUMENT

The present application is a Continuation of International Patent Application No. PCT/JP2022/004229 filed on Feb. 3, 2022, and also claims the benefit of priority of Japanese Patent Application No. 2021-028217 filed on Feb. 25, 2021 and Japanese Patent Application No. 2022-008670 filed on Jan. 24, 2022, the disclosures of which are incorporated in their entirety herein by reference.

TECHNICAL FIELD

This disclosure relates generally to a wireless power transmission system.

BACKGROUND ART

There is proposed a wireless power transmission system which wirelessly delivers electric power from a power transmitter serving as a primary unit to a power receiver serving as a secondary unit. For instance, Japanese translation of PCT application publication No. 2002-508916 discloses an inductive power transfer system which works to transfer electric power from a primary inductive conductor (i.e., primary coil) to a secondary resonance pickup circuit through an intermediate resonance loop which resonates at a system frequency.

SUMMARY OF THE INVENTION

When a capacitance of a capacitor mounted in each of a plurality of resonant circuits installed in a wireless power transmission system working to transfer electric power from a primary resonant circuit that is one of the resonant circuits to a secondary resonant circuit that is one of the resonant circuits is, like prior art systems, selected to resonate with a self-inductance of a corresponding one of the resonant circuits at a frequency of induced electric power, it leads to a risk that a power factor of the induced electric power may decrease. Such a decrease in power factor will undesirably lead to an increase in loss of electrical energy outputted to the primary resonant circuit. This drawback becomes significant as a coupling coefficient between the coil of the primary resonant circuit and the coil of the secondary resonant circuit becomes high.

This disclosure was made in order to solve at least one of the above problems and may be realized as the following modes or examples of application.

According to one aspect of this disclosure, there is provided a wireless power transmission system which works to supply electric power wirelessly from a power transmitter to a power receiver. The wireless power transmission system comprises: (a) a power transmitter which includes a primary resonant circuit and an alternating-current source, the primary resonant circuit including a primary coil and a primary capacitor for use in power transmission, the alternating-current source working to apply ac power at a given operating frequency to the primary resonant circuit; (b) a power receiver which includes a secondary resonant circuit, the secondary resonant circuit including a secondary coil and a secondary capacitor for use in a power reception, the secondary coil being to be magnetically coupled with the primary coil; and (c) a tertiary resonant circuit which includes a tertiary coil and a tertiary capacitor. The tertiary coil is arranged to achieve magnetic coupling with the primary coil and the secondary coil. The tertiary capacitor constitutes a short-circuit resonant circuit along with the tertiary coil. The primary coil has a self-inductance L1. A capacitance of the primary capacitor is set to a capacitance C1, as given by Eq. (1) below, to cause resonance in the primary capacitor and the primary coil at an angular frequency $\omega 0$ that is the operating frequency.

$$C1 = \frac{1}{\omega o^2 \cdot L1} \quad (1)$$

The tertiary coil has a self-inductance L3. A capacitance of the tertiary capacitor is set to a capacitance C3, as given by Eq. (2) below, to cause resonance in the tertiary capacitor and the tertiary coil at the operating frequency.

$$C3 = \frac{1}{\omega o^2 \cdot L3} \quad (2)$$

A capacitance of the secondary capacitor is determined to decrease a reactive component of the ac power which arises from the self-inductances and mutual inductances of the primary coil, the secondary coil, and the tertiary coil.

When electrical energy is transferred from the power transmitter to the power receiver, the wireless power transmission system is capable of decreasing a reactive component of ac power applied from the alternating-current source to the primary resonant circuit, thereby minimizing a drop in power factor of the ac power supplied to the primary resonant circuit. This reduces a loss of energy in the alternating-current source. For instance, in a case where the alternating-current source is equipped with an inverter and a filter, an energy loss is reduced in the inverter and the filter. The above structure of the wireless power transmission system is also capable of determining the capacitance of the primary capacitor of the primary resonant circuit and the capacitance of the tertiary capacitor of the tertiary resonant circuit regardless of coupling coefficients of the primary coil, the secondary coil, and the tertiary coil, thereby resulting in an increase in available types of the power receiver to which electrical energy is transferred from the power transmitter

BRIEF DESCRIPTION OF THE DRAWINGS

The present disclosure will be understood more fully from the detailed description given hereinbelow and from the accompanying drawings of the preferred embodiments of the invention.

In the drawings:

FIG. 8A is an explanatory view which represents a relation between a deviation from a capacitance of a secondary capacitor and a power factor;

FIG. 8B is an explanatory view which represents relations between a capacitance of a tertiary capacitor and an electrical current flowing through a primary coil in two different types of structure;

MODE FOR CARRYING OUT THE INVENTION

A. First Embodiment

Figure 1:
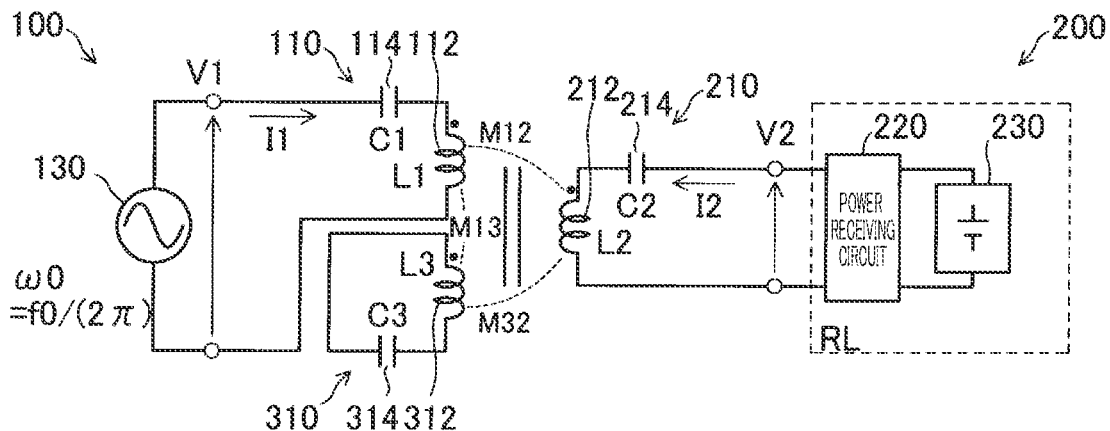
FIG. 1 is a schematic view which illustrates a structure of a wireless power transmission system according to the first embodiment.

A wireless power transmission system in the first embodiment, as illustrated in FIG. 1, includes the power transmitter 100, the power receiver 200, and the tertiary resonant circuit 310. The power receiver 200 receives electric power wirelessly delivered from the power transmitter 100.

The power transmitter 100 includes the primary resonant circuit 110 and the alternating-current source 130. The primary resonant circuit 110 is an electrical circuit working to supply electric power to the power receiver 200 using electromagnetic induction due to resonance. Specifically, the primary resonant circuit 110 includes the primary coil 112 and the primary capacitor 114 connected directly to the primary coil 112. The primary capacitor 114 functions as a resonant capacitor to resonate electric power applied to the primary coil 112. The alternating-current source 130 is a device working to apply an ac power at a preselected operating frequency f0 (i.e., angular frequency ω0) to the primary resonant circuit 110. The alternating-current source 130 includes a power supply device which converts an ac power produced by an external power supply into a dc power and an inverter which works to convert the dc power delivered from the power supply device into an ac power at an operating frequency. The alternating-current source 130 may also include a filter following the inverter in the signal path.

The power receiver 200 may be installed in a variety of devices, such as electronic devices or electric automobiles, which are operated using electric power. The power receiver 200 includes the secondary resonant circuit 210, the power receiving circuit 220, and the battery 230. The secondary resonant circuit 210, like the primary resonant circuit 110, includes the secondary coil 212 and the secondary capacitor 214 which is connected in series with the secondary coil 212 and serves as a resonant capacitor. The secondary resonant circuit 210 is a circuit which obtains ac power, as induced in the secondary coil 212, when the secondary coil 212 and the primary coil 112 are in magnetic resonant coupling with each other.

The power receiving circuit 220 is a device working to convert ac power, as derived in the secondary resonant circuit 210, into dc power to charge the battery 230. The electrical energy stored in the battery 230 is used as electric power in a device in which the power receiver 200 is installed. In other words, each of the power receiving circuit 220 and the battery 230 functions as an electrical load in the secondary resonant circuit 210. In the following discussion, the power receiving circuit 220 and the battery 230 will also be referred to as the resistive load RL.

The tertiary resonant circuit 310 is designed as a closed circuit made up of the tertiary coil 312 and the tertiary capacitor 314 serving as a resonant capacitor.

When it is required to transfer electric power from the power transmitter 100 to the power receiver 200, the secondary resonant circuit 210 is arranged to place the secondary coil 212 in magnetic coupling with the primary coil 112 of the primary resonant circuit 110. The tertiary resonant circuit 310 is also arranged to place the tertiary coil 312 in magnetic coupling with the primary coil 112 and the secondary coil 212. FIG. 1 indicates the magnetic coupling of the coils 312 and 112 with the coil 212 using two parallel straight lines.

The primary coil 12 of the primary resonant circuit 110 has the self-inductance L1. The primary capacitor 114 has the capacitance C1 given by the following Eq. (1) to undergo resonance with the primary coil 112 at the angular frequency ω0 that is the operating frequency f0.

$$C1 = \frac{1}{\omega o^2 \cdot L1} \quad (1)$$

The tertiary coil 312 of the tertiary resonant circuit 310 has the self-inductance L3. The tertiary capacitor 314 has the capacitance C3 given by the following Eq. (2) to undergo resonance with the tertiary coil 312 at the angular frequency ω0.

$$C3 = \frac{1}{\omega o^2 \cdot L3} \quad (2)$$

The secondary coil 212 of the secondary resonant circuit 210 has the self-inductance L2. The secondary capacitor 214 is preferably designed to have a capacitance higher than the capacitance C2r given by the following Eq. (3). Specifically, it is advisable that the secondary capacitor 214 have the capacitance C2 defined by the following Eq. (4). Note that the capacitance C2r is a value selected to resonate the secondary capacitor 214 and the secondary coil 212 at the angular frequency ω0.

$$C2r = \frac{1}{\omega 0^2 \cdot L2} \quad (3)$$

$$C2 = \frac{1}{\omega 0^2 \left[ L2 - \frac{2 \cdot M12 \cdot M32}{M13} \right]} \quad (4)$$

where Mnm is a mutual inductance of an $n^{th}$-order coil and an $m^{th}$-order coil. The mutual inductance Mnm is expressed by a relation of Mnm=knm√(Ln·Lm). Eq. (4) above may be rewritten as the following Eq. (6).

$$C2 = \frac{1}{\omega 0^2 \cdot L2 \left[ 1 - (2 \cdot k12 \cdot k32)/k13 \right]} \quad (6)$$

where knm is a coupling coefficient which represents a difference in coupled state between the $n^{th}$-order coil and the $m^{th}$-order coil, that is, the degree of coupling between the $n^{th}$-order coil and the $m^{th}$-order coil. The coupling coefficient knm is higher than −1 and lower than +1 depending upon a positional relation between the $n^{th}$-order coil and the $m^{th}$-order coil. Ln is a self-inductance of the $n^{th}$-order coil. Lm is a self-inductance of the $m^{th}$-order coil. The value of the mutual inductance Mnm, therefore, increases with an increase in the coupling coefficient knm.

The coupling coefficient knm in the absence of magnetic coupling between the coils will be zero. This results in the mutual inductance Mnm being zero. For instance, in the absence of the power receiver 200, the coupling coefficient k12 of the primary coil 112 and the secondary coil 212 will be zero. The mutual inductance M12 of the primary coil 112 and the secondary coil 212 will be zero.

Note that the mutual inductances M12, M13, and M32 used to set the capacitance of the secondary capacitor 214 to the capacitance C2 given by Eq. (4) above are given by values derived using the coupling coefficients k12, k13, and k32 as a function of positional relation among the coils.

The input impedance Zin from the alternating-current source 130 to the primary resonant circuit 110 is defined by Eq. (7) below using circuit equations of the primary resonant circuit 110, the secondary resonant circuit 210, and the tertiary resonant circuit 310.

$$Zin = \frac{V1}{I1} = \left( j\omega 0 \cdot L1 + \frac{1}{j\omega 0 \cdot C1} \right) + \frac{M13^2}{M32^2} \left( j\omega 0 \cdot L2 + \frac{1}{j\omega 0 \cdot C2} \right) - 2j\omega 0 \cdot M12 \frac{M13}{M32} + \frac{M13^2}{M32^2} RL \quad (7)$$

Eq. (7) omits resistance components because the resistances r1, r2, and r3 in windings of the primary coil 112, the secondary coil 212, and the tertiary coil 312 are much lower than reactances [ω0·L1], [ω0·L2], and [ω0·L3] at the operating frequency f0.

The delivery of ac power, as inputted from the alternating-current source 130 to the primary resonant circuit 110, to the secondary resonant circuit 210 at high efficiency requires decreasing an imaginary component in Eq. (7) to enhance the power factor of ac power. Ideally, the imaginary component is preferably set to zero.

Eq. (1) above is derived by setting the first term [jω0·L1+1/(jω0·C1)] in Eq. (7) to zero. The satisfaction of Eq. (1) enables circuit constants in the primary resonant circuit 110 to be determined regardless of the degree of mutual coupling among the primary coil 112, the secondary coil 212, and the tertiary coil 312.

Eq. (4) above is derived by setting {(M13/M32)² [jω0·C2)]−2jω0·M12·M13/M32} in the second and third terms of Eq. (7) to zero.

Eq. (2) above may be used, like the capacitance C1 in Eq. (1), to determine circuit constants in the tertiary resonant circuit 310 regardless of the degree of mutual coupling among the primary coil 112, the secondary coil 212, and the tertiary coil 312.

Eq. (2) may be obtained in the following way. For instance, in the absence of the power receiver 200 in a case where the tertiary coil 312 has a constant positional relation to the primary coil 112, it is usually required to maximize the input impedance Zin against current from the alternating-current source 130 to the primary resonant circuit 110 in order to eliminate an excess current input thereto. The input impedance Zin is expressed by Eq. (8) using circuit equations in the primary resonant circuit 110 and the tertiary resonant circuit 310.

$$Zin = \frac{V1}{I1} = j\omega 0 \cdot L1 + \frac{1}{j\omega 0 \cdot C1} + \frac{(\omega 0 \cdot M13)^2}{j\omega 0 \cdot L3 + 1/(j\omega 0 \cdot C3)} \quad (8)$$

Eq. (8) omits resistance components for the same reasons as for Eq. (7).

The input impedance Zin expressed by Eq. (8) is maximized when an imaginary component of a denominator in the fourth term, i.e., [jω0·L3+1/(jω0·C3)] is zero. Eq. (2) above may, therefore, be derived using a relation of [jω0·L3+1/(jω0·C3)]=0.

Figure 2:
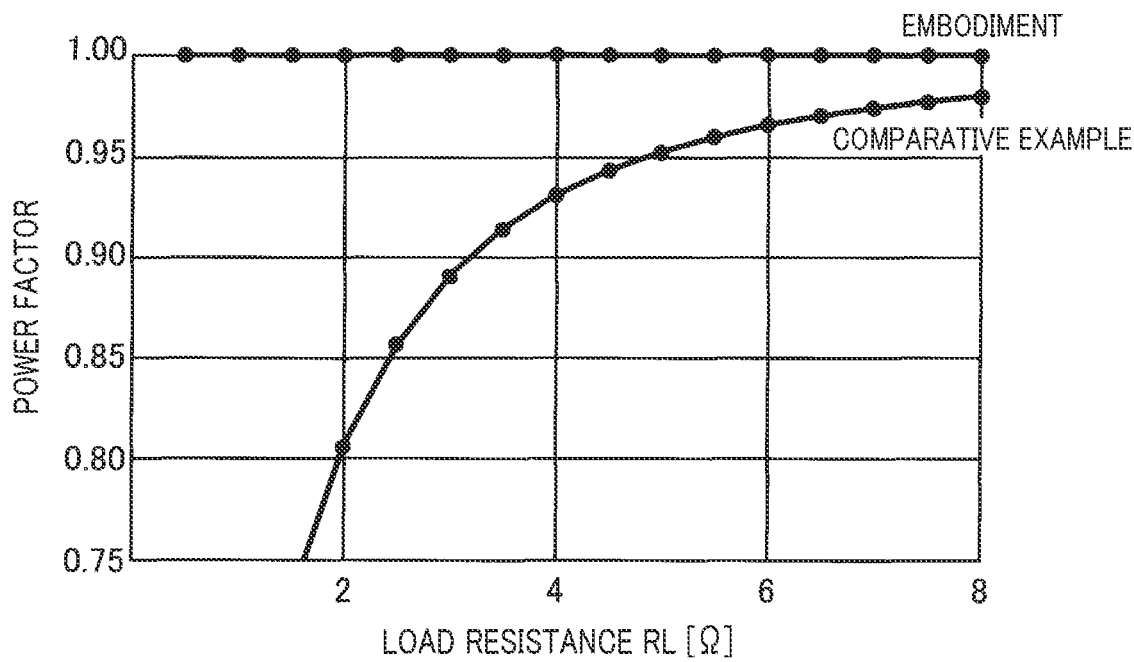
FIG. 2 is an explanatory view which represents a relation between a resistive load (i.e., a load resistance) and a power factor in the first embodiment.

We conducted simulations about a relation between the resistive load RL and the power factor in the embodiment in which the capacitance of the secondary capacitor 214 is determined according to Eq. (4) above and a comparative example in which the capacitance of the secondary capacitor 214 is determined according to Eq. (3) above. Results of the simulations are shown in FIG. 2. Note that the capacitance C1 of the primary capacitor 114 and the capacitance C3 of the tertiary capacitor 314 are determined according to Eqs. (1) and (2). The graph in FIG. 2 shows that in the comparative example, the power factor is less than one, which results from the effect of a reactive component of the ac power, and that the smaller the resistive load RL, in other words, the higher the load, the smaller the power factor. In contrast, the graph shows that in this embodiment, the power factor is kept constant to be one regardless of the value of the resistive load RL, which achieves the highest-efficiency in transferring the ac power.

Figure 3:
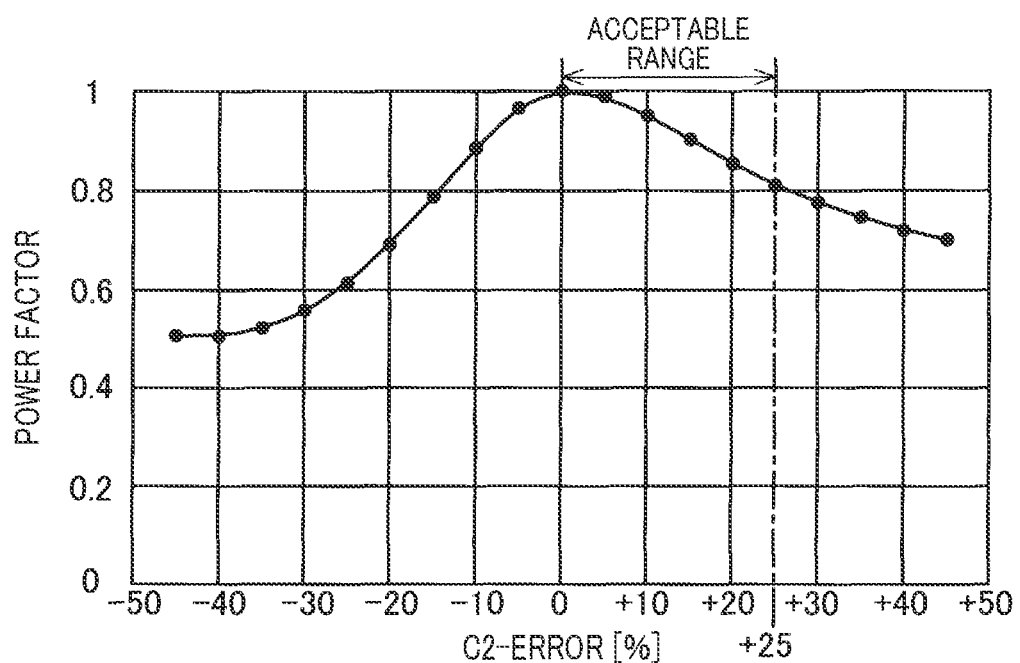
FIG. 3 is an explanatory view which represents a relation between a deviation or error from a capacitance of a secondary capacitor and a power factor.

We also conducted simulations about a relation between an error [%] that is a deviation from the capacitance C2 defined by Eq. (4) above and the power factor. Results of the simulations are illustrated in the graph of FIG. 3. The graph shows that a reduction in power factor may be minimized by decreasing a reactive component of ac power without having to set the capacitance of the secondary capacitor 214 to the capacitance C2 derived according to Eq. (4) above. For instance, the power factor may be improved to be 0.6 or more in a range of the error between −25% and +45%. The power may also be improved to be 0.8 or more in a range of the error between −15% and +25%. Note that the above values are round off to one decimal place. Negative value of the errors results in rate of a reduction in power factor lower than positive values of the errors. It is, thus, advisable that the error be in a range of 0% to +25%.

[M12·M21/M13] in Eq. (4) above usually has a positive value, thus causing the capacitance C2, as derived according to Eq. (4), to have a value greater than the capacitance C2r expressed by Eq. (3) above (i.e., C2>C2r), The capacitance of the secondary capacitor 214 may be set to a value greater than the capacitance C2r given by Eq. (3) in order to reduce the reactive component of ac power to minimize the reduction in power factor. [M12·M32/M13] may have a negative value depending upon the degree of coupling among the coils. In such a case, the capacitance C2 defined by Eq. (4) will be smaller than the capacitance C2r defined by Eq. (3) (i.e., C2<C2r). The capacitance of the secondary capacitor 214 may be set to a value smaller than the capacitance C2r given by Eq. (3) in order to decrease the reactive component of ac power to minimize the reduction in power factor.

For the reasons described above, the capacitance of the secondary capacitor 214 may be determined to decrease the reactive component of the ac power, as arising from the self-inductances L1, L2, and L3 and the mutual inductances M12, M13, and M32 of the primary coil 112, the secondary coil 212, and the tertiary coil 312, to minimize the reduction in power factor.

As apparent from the above discussion, when it is required to transfer electricity from the power transmitter 100 to the power receiver 200, the structure in this embodiment is capable of minimizing the reduction in power factor of ac power delivered from the alternating-current source 130 to the primary resonant circuit 110, thereby ensuring the high efficiency of transfer of power to the power receiver 200.

B. Second Embodiment

The first embodiment is, as described above, designed to have the secondary coil 212 of the secondary resonant circuit 210 which is arranged in magnetic coupling with the primary coil 112 of the primary resonant circuit 110 and also have the tertiary coil 312 of the tertiary resonant circuit 310 which is arranged in magnetic coupling with each of the primary coil 112 and the secondary coil 212. In other words, the first embodiment is configured not to specify the positional relation among the primary coil 112, the secondary coil 212, and the tertiary coil 312. The second embodiment is designed to specify a desirable relation in location among the above coils.

Figure 4:
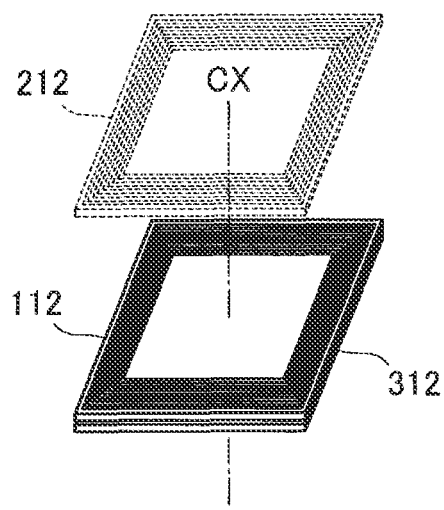
FIG. 4 is an explanatory view which demonstrates layout of a primary coil and a tertiary coil in the second embodiment.

The tertiary coil 312 is, as illustrated in FIG. 4, preferably stacked on the surface of the primary coil 112 which faces away from the secondary coil 212, in other words, is arranged on the opposite side of the primary coil 112 to the secondary coil 212. Although not illustrated in the drawings, the tertiary coil 312 may alternatively be stacked on the surface of the primary coil 112 which directly faces the secondary coil 212 or arranged adjacent to the side surface (i.e., the peripheral surface) of the primary coil 112. In other words, it is advisable that the tertiary coil 312 be arranged closer to the primary coil 112, i.e., the power transmitter 312 than to the secondary coil 212 or directly on the primary coil 112 so as to achieve a constant coefficient k13 (also referred to as inductive coupling factor) of coupling with the primary coil 112. The stacking of the tertiary coil 312 on the primary coil 112 is easier to increase the coupling coefficient k13 than the arrangement of the tertiary coil 312 adjacent to the primary coil 112.

The input impedance Zin given by Eq. (7) may be rewritten using Eqs. (1), (2), and (4) as being expressed according to Eq. (9) as a function of the resistive load RL.

$$Zin = \left(\frac{k13}{k32}\right)^2 \frac{L1}{L2} RL \qquad (9)$$

When the tertiary coil 312 is, as described above, arranged close to or on the primary coil 112, it will result in a constant positional relation between the primary coil 112 and the tertiary coil 312, so that the coupling coefficient k13 will be kept constant. Alternatively, when a distance at which the secondary coil 212 is away from the primary coil 112 is increased, it will result in a decrease in coefficient k32 of coupling between the tertiary coil 312 and the secondary coil 212. The input impedance Zin expressed by Eq. (9), thus, increases. Accordingly, when the secondary coil 212 moves away from the primary coil 112, and the power transmitter 100 transfers no power to the power receiver 200, a decrease in electric power delivered from the alternating-current source 130 to the primary resonant circuit 110, i.e., electrical current flowing through the primary coil 112 (which will also be referred to as coil current) may be achieved by increasing the input impedance Zin. This results in a decrease in undesirable loss of electric power, which will reduce the leakage of magnetic flux generated in the primary coil 112.

Figure 5:
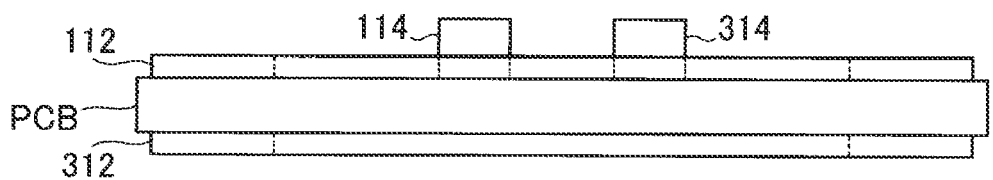
FIG. 5 is an explanatory view which illustrates structures of a primary coil and a tertiary coil formed integrally with each other.

It is, as demonstrated in FIG. 5, preferable that the primary coil 112 and the tertiary coil 312 are formed or fabricated integrally in the form of a multi-layered printed circuit board with the primary capacitor 114 and the tertiary capacitor 314 mounted on a surface of the multi-layered printed circuit board. This structure enhances the coupling coefficient k13 of the primary coil 112 and the tertiary coil 312 and the coupling coefficient k13.

The coefficient η of transmission of ac power from the power transmitter 100 to the power receiver 200 is given by the following Eq. (10) using circuit equations of the primary resonant circuit 110, the secondary resonant circuit 210, and the tertiary resonant circuit 310.

$$\eta = \frac{RL}{RL + r2 + \left(\frac{M32}{M13}\right)^2 + r3\left\{\left(\frac{M12}{M13}\right)^2 + \left(\frac{RL}{\omega 0 \cdot M32}\right)^2\right\}} \qquad (10)$$

The transmission coefficient η expressed by Eq. (10) is maximized when the capacitance C2 of the secondary capacitor 214 is defined by Eq. (4) above. The optimum load RLopt is given by Eq. (11).

$$RLopt = \omega 0 \cdot M32 \sqrt{\left(\frac{M12}{M13}\right)^2 + \frac{r1}{r3}\left(\frac{M32}{M13}\right)^2 + \frac{r2}{r3}} \qquad (11)$$

By substituting Eq. (11) in Eq. (10) and rewriting it using knm (nm=12, 13, 32) and Qi(=ω·Li/ri)(i=1, 2, 3), the maximum coefficient nmax is expressed by Eq. (12) below where ri is a resistance in a winding of an $i^{th}$-order coil $$\eta \max = \cfrac{1}{1 + \cfrac{2}{k13 \cdot k32} \sqrt{\cfrac{k12^2 \cdot Q1 \cdot Q2 + k32^2 \cdot Q3 \cdot Q2 + k13^2 \cdot Q1 \cdot Q3}{Q1 \cdot Q2 \cdot Q3^2}}} \quad (12)$$

Eq. (12) shows that the transmission coefficient may be enhanced by increasing the coupling coefficient k13 of the primary coil 112 and the tertiary coil 312 or the coupling coefficient k32 of the tertiary coil 312 and the secondary coil 212. For the reasons described above, it is advisable that the coupling coefficient k13 of the primary coil 112 and the tertiary coil 312 be increased by forming the primary coil 112 and the tertiary coil 312 integrally with a multi-layered printed circuit board. This improves the power transmission coefficient. The primary capacitor 114 and the tertiary capacitor 314 are preferably mounted on the same multi-layered printed circuit board as the primary coil 112 and the tertiary coil 312, thereby minimizing parasitic inductances or capacitances which will exist between conductive wires on the multi-layered printed circuit board to reduce a deviation of the resonant frequency.

Instead of forming the secondary coil 212 and the tertiary coil 312 integrally with each other using a printed circuit board, the primary coil 112 and the tertiary coil 312 are preferably formed integrally with each other using a printed circuit board in favor of increasing the input impedance Zin in the absence of the power receiver 200.

In the example illustrated in FIG. 5, the two-layered printed circuit board has a first and second major surfaces. The primary coil 112 is arranged on the first major surface, while the tertiary coil 312 is arranged on the second major surface. The primary coil 112 and the tertiary coil 312 may alternatively be formed integrally with each other using a three or more-layered printed circuit board.

C. Third Embodiment

Figure 6:
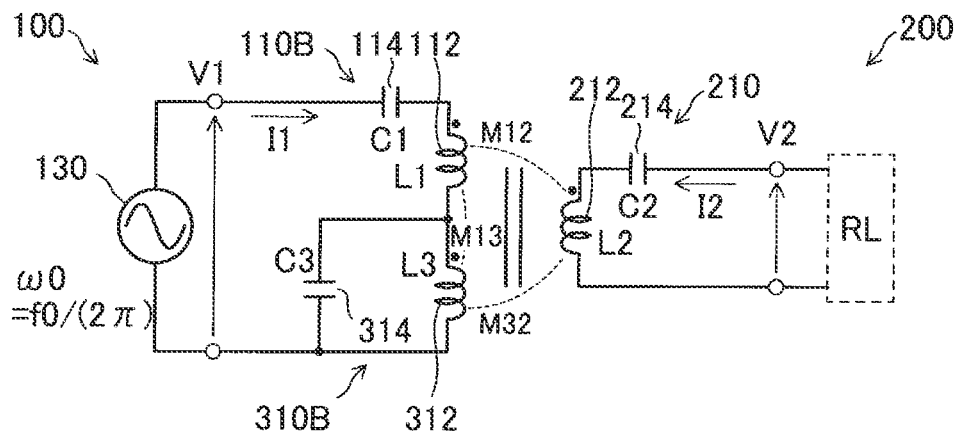
FIG. 6 is a schematic view which illustrates a structure of a wireless power transmission system in the third embodiment.

The structure in the first embodiment illustrated in FIG. 1 has the tertiary resonant circuit 310 discrete from the primary resonant circuit 110, while the structure in the third embodiment is, as illustrated in FIG. 6, designed to include the tertiary resonant circuit 310B with the tertiary coil 312 connected directly to the primary coil 112 of the primary resonant circuit 110B. The tertiary resonant circuit 310B has the tertiary capacitor 314 connected in parallel to the tertiary coil 312.

The primary coil 112 of the primary resonant circuit 110E has the self-inductance L1. The capacitance of the primary capacitor 114 may be selected as the capacitance C1 given by Eq. (1) to resonate with the primary coil 112 at the angular frequency ω0 of the operating frequency f0. This is for the same reasons as described in the first embodiment about the primary resonant circuit 110.

The tertiary coil 312 of the tertiary resonant circuit 310B has the self-inductance L3. The capacitance of the tertiary capacitor 314 may be set to the capacitance C3 given by Eq. (2) to resonate the tertiary capacitor 314 and the tertiary coil 312 at the angular frequency ω0. This is also for the same reasons as described in the first embodiment about the tertiary resonant circuit 310.

In the secondary resonant circuit 210 in this embodiment, it is advisable, like in the first embodiment, that the capacitance of the secondary capacitor 214 be set to a value greater than the capacitance C2r defined by Eq. (3) in a condition where the secondary coil 212 has the self-inductance L2. Specifically, it is best advisable that the capacitance of the secondary capacitor 214 be defined as the capacitance C2 given by Eq. (5) below, not by Eq. (4).

$$C2 = \cfrac{1}{\omega 0^2 \left[ L2 - \cfrac{2 \cdot M12 \cdot M32}{L3 + M13} - \cfrac{M32^2 \cdot L3}{(L3 + M13)^2} \right]} \quad (5)$$

Eq. (5) is derived in the following way. The input impedance Zin from the alternating-current source 130 to the primary resonant circuit 110B or the tertiary resonant circuit 310B is given by Eq. (13) below which is derived using circuit equations of the primary resonant circuit 110B, the secondary resonant circuit 210, and the tertiary resonant circuit 310B and Eqs. (1) and (2) above.

$$Zin = \\ \cfrac{V1}{I1} = \cfrac{(L3 + M13)^2}{M32^2} \left( j\omega 0 \cdot L2 + \cfrac{1}{j\omega 0 \cdot C2} \right) - 2j\omega 0 \cfrac{M12(L3 + M13)}{M32} + \\ j\omega 0 \cdot M13 - j\omega 0(L3 + M13) + \cfrac{(L3 + M13)^2}{M32^2} RL \quad (13)$$

Note that Eq. (13) omits resistive components for the same reasons as referred to in Eq. (7).

In order to transfer ac power, as applied from the alternating-current source 130 to the primary resonant circuit 110B, to the secondary resonant circuit 210 with a high degree of efficiency, imaginary components in Eq. (13) are preferably decreased to enhance the power factor of the ac power. Ideally, the imaginary components are decreased to zero.

Therefore, Eq. (5) is derived by setting imaginary components in the first to fourth terms in Eq. (13) to zero.

Figure 7:
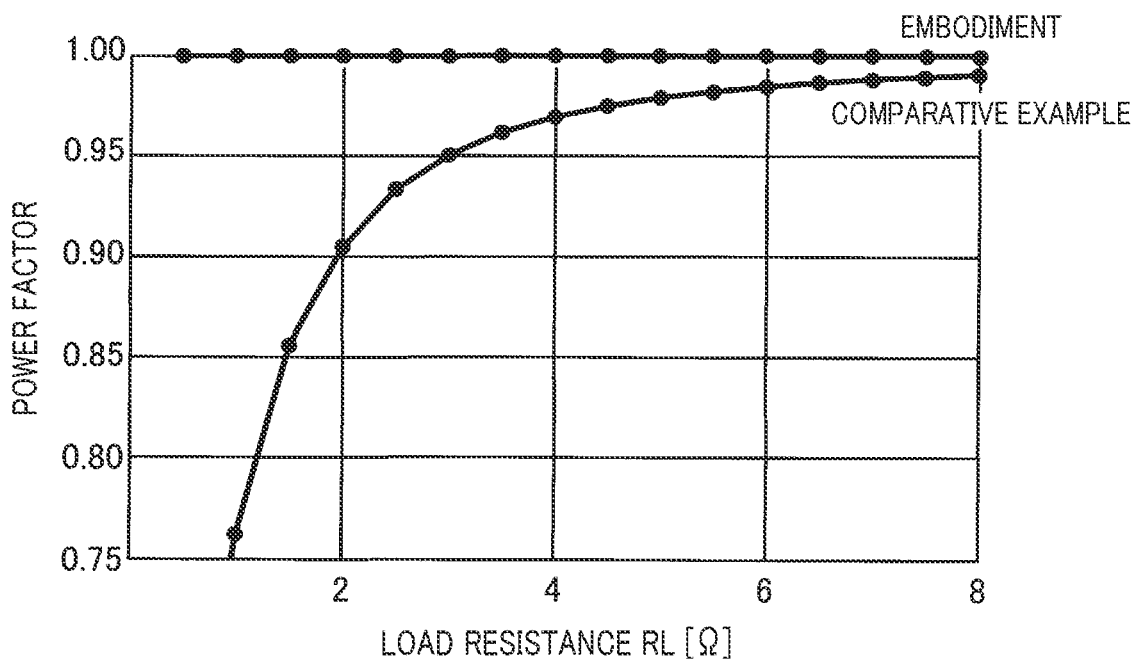
FIG. 7 is an explanatory view which represents a resistive load and a power factor in the third embodiment.

We conducted simulations about a relation between the resistive load RL and the power factor in the embodiment in which the capacitance of the secondary capacitor 214 is determined according to Eq. (5) above and a comparative example in which the capacitance of the secondary capacitor 214 is determined according to Eq. (3) above. Results of the simulations are shown in FIG. 7. Note that the capacitance C1 of the primary capacitor 114 and the capacitance C3 of the tertiary capacitor 314 are determined according to Eqs. (1) and (2). The graph in FIG. 7 shows that the power factor in the comparative example is higher than that in the comparative example referred to in the first embodiment with reference to FIG. 2, but less than one, which results from the effect of a reactive component of the ac power, and that the smaller the resistive load RL, in other words, the higher the load, the smaller the power factor. In contrast, the graph shows that the power factor in the third embodiment is kept constant to be one regardless of the value of the resistive load RL, which achieves the highest-efficiency in transferring the ac power.

We also conducted simulations about a relation between an error [%] that is a deviation from the value of the capacitance C2 given by Eq. (5) above and the power factor. Results of the simulations are illustrated in the graph of FIG. 8A. The graph shows that a reduction in power factor may be minimized by decreasing a reactive component of ac power without having to set the capacitance of the secondary capacitor 214 exactly to the value of the capacitance C2 derived according to Eq. (5) above. For instance, the power factor may be improved to be 0.6 or more in a range of the error between −25% and +45% of the capacitance C2. The power factor may also be improved to be 0.8 or more in a range of the error between −15% and +25% of the capacitance C2. Note that the above values are round off to one decimal place. Negative value of the errors results in rate of a reduction in power factor lower than positive values of the errors. It is, thus, advisable that the error be in a range of 0% to +25% of the capacitance C2.

The third embodiment may be designed to have the primary coil 112 and the tertiary coil 312 which are arranged in the same positional relation to each other as described in the second embodiment.

As apparent from the above discussion, when it is required to transfer electricity from the power transmitter 100 to the power receiver 200, the structure in this embodiment is capable of minimizing the reduction in power factor of ac power delivered from the alternating-current source 130 to the primary resonant circuit 110, thereby ensuring the high efficiency of transfer of power to the power receiver 200, We also conducted simulations about a relation between the capacitance C3 and electric current flowing through the primary coil 112 in a circuit structure in which the tertiary resonant circuit 310 is discrete or separate from the primary resonant circuit 110 illustrated in FIG. 1 (which will also be referred to as a separate type circuit) and the third embodiment illustrated in FIG. 6 in which the tertiary coil 312 is electrically connected or inked to the primary coil 112 (which will also be referred to as a linked type circuit). Results of the simulations are shown in FIG. 8B. "RESONANCE POINT" in FIG. 8B is the capacitance C3 determined according to Eq. (2) above. FIG. 8B shows that when the capacitance C3 deviates from the resonance point, the current flows through the primary coil 112. The deviation of the capacitance C3 from the resonance point may occur due to manufacturing errors in the tertiary capacitor 314. An increase in deviation of the capacitance C3 will result in an increase in current flowing through the primary coil 112.

When the secondary coil 212 is located away from the primary coil 112, the amount of current flowing through the primary coil 112 is decreased by increasing the input impedance Zin expressed by Eq. (9) above. The absence of the secondary coil 212 may be detected by finding the fact that the current flowing through the primary coil 112 is lower than or equal to a given value. However, when the capacitance C3, as demonstrated in FIG. 8B, deviates from the resonance point, it may cause a large amount of current to flow through the primary coil 112, which results in decreased accuracy in determining whether the secondary coil 212 is present or absent.

The results of simulations indicated in FIG. 8B show that when the capacitance C3 deviates from the resonance point, the linked type circuit is capable of decreasing the amount of current flowing through the primary coil 112 to be lower than that in the separate type circuit illustrated in FIG. 1. The structure in this embodiment is, therefore, capable of minimizing a reduction in accuracy in detecting the presence or absence of the secondary coil 212 as compared with the separate type circuit when the capacitance C3 deviates from the resonance point due to, for example, a production error of the tertiary capacitor 314.

D. Fourth Embodiment

The presence or absence of the power receiver 200 that is a target to which electric power is required to be transferred may be detected by the power transmitter 100 by measuring a decrease in current flowing through the primary coil 112 arising from a change in the input impedance Zin described in the second embodiment.

Figure 9:
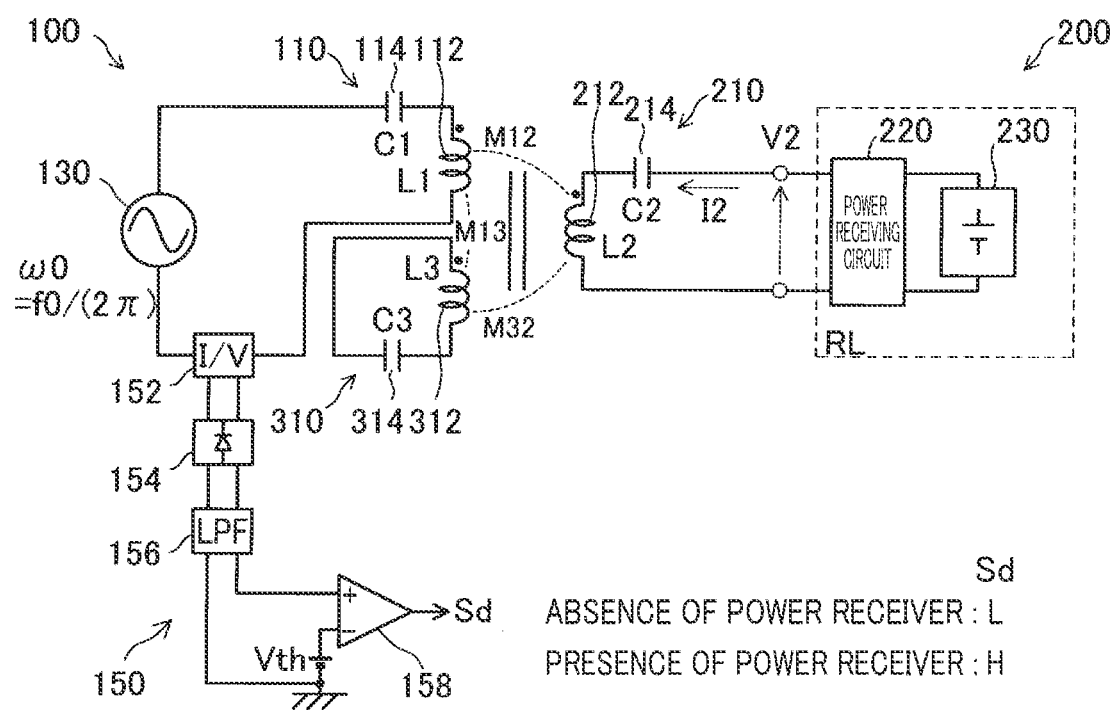
FIG. 9 is a schematic view which illustrates a structure of a wireless power transmission system in the fourth embodiment.

The wireless power transmission system in FIG. 9 has the same structure as in FIG. 1 and also includes the power receiver sensing circuit 150 which works to measure a decrease in coil current to detect the presence or absence of the power receiver 200. The power receiver sensing circuit 150 includes the current measuring circuit 152, the rectifier circuit 154, the low-pass filter (LPF) 156, and the comparator 158.

The current measuring circuit 152 works to measure an ac coil current (I) that is an ac electric current flowing through one of two conductors connecting between the alternating-current source 130 and the primary resonant circuit 110 Convert the coil current (I) into an ac voltage (V) (which will also be referred to as a detection voltage), and output the ac voltage (V). The current measuring circuit 152 may alternatively be designed to measure electric current flowing through the other conductor connecting between the alternating-current source 130 and the primary resonant circuit 110. The rectifier circuit 154 works to rectify the ac voltage (V). The low-pass filter 156 works to remove high-frequency components from the rectified ac voltage (V). The comparator 158 outputs the detection signal Sd of a H-level indicating the presence of a power receiver when the power receiver 200 that is a target to which electric power is required to be transferred exists, and the detection voltage (i.e., the ac voltage (V)) is higher than a threshold voltage Vth, in other words, the coil current is high. Alternatively, when the power receiver 200 is absent, and the detection voltage has dropped below the threshold voltage Vth, in other words, the coil current has decreased, the comparator 158 outputs the detection signal Sd of a L-level indicating the absence of the power receiver. This enables the presence of the power receiver 200 to be detected when the detection signal Sd is at the high level or alternatively the absence of the power receiver 200 to be detected when the detection signal Sd is at the low level. The comparator 158 may alternatively designed to have input terminals changed for each other, so that the detection signal Sd has the high level indicting the absence of the power receiver 200 or the low level indicating the presence of the power receiver 200.

Although not illustrated and described in detail, when the detection signal Sd has a level indicating the presence of the power receiver 200, the wireless power transmission system actuates the alternating-current source 130 to apply ac power from the alternating-current source 130 to the primary resonant circuit 110. This achieves the high efficiency in transferring electric power from the power transmitter 100 to the power receiver 200. Alternatively, when the detection signal Sd has a level indicating the absence of the power receiver 200, meaning that there is no target to which electrical power is required to be delivered, that is, that the power transmitter 100 is in a non-power feeding mode, the wireless power transmission system deactivates the alternating-current source 130 to deliver no ac power from the alternating-current source 130 to the primary resonant circuit 110. This minimizes a useless supply of electric power from the alternating-current source 130 to the primary resonant circuit 110, thereby reducing leakage of magnetic flux generated in the primary coil 112.

The power receiver sensing circuit 150 is, as described above, designed to detect a drop in coil current, but however, may alternatively be configured to detect a reduction in magnetic flux generated in the primary coil 112 which arises from a drop in coil current. The reduction in magnetic flux in the primary coil 112 may be sensed by a magnetic flux sensing circuit using a magnetic sensor or an inductive current sensing circuit using a coil instead of the current measuring circuit 152.

The fourth embodiment is, as described above, designed to have the same structure as in the first embodiment (see FIG. 1), but however, may alternatively be configured to have the same structure as in the third embodiment (see FIG. 6).

E. Fifth Embodiment

When the tertiary coil 312 is arranged on the side of the primary coil 112 in the structure in FIG. 1 (see FIG. 1), the absence of the secondary coil 212, as described in the second embodiment, will result in an increase in input impedance Zin expressed by Eq. (9), thereby decreasing electrical current flowing through the primary coil 112. Such current continues to flow as standby current through the primary coil 112. Such a standby current I1ds may be expressed by Eq. (14) below.

$$I1s = \frac{r3 + j\left(\omega 0 \cdot L3 - \frac{1}{\omega 0 \cdot C3}\right)}{\left\{r1 + j\left(\omega 0 \cdot L1 - \frac{1}{\omega 0 \cdot C1}\right)\right\}\left\{r3 + j\left(\omega 0 \cdot L3 - \frac{1}{\omega 0 \cdot C2}\right)\right\} + \omega 0^2 \cdot M13^2} V1 \quad (14)$$

The standby current I1s may be several amperes depending upon values of circuit constants of the primary resonant circuit 110 and the tertiary resonant circuit included in Eq. (14) above, which results in a useless loss of electric power to cause leakage of magnetic flux to occur in the primary coil 112.

The standby current I3s expressed by Eq. (15) below also continues to flow through the tertiary coil 312. The standby current I3s, like the standby current I1s, causes the leakage of magnetic flux to occur in the tertiary coil 312.

$$I3s = \frac{(j\omega 0 \cdot M12)}{\left(\left\{r1 + j\left(\omega 0 \cdot L1 - \frac{1}{\omega 0 \cdot C1}\right)\right\}\left\{r3 + j\left(\omega 0 \cdot L3 - \frac{1}{\omega 0 \cdot C3}\right)\right\} + \omega 0^2 \cdot M13^2\right)} \quad (15)$$

For instance, when a decrease in current flowing through the primary coil 112 is, as described below in detail, detected, in other words, a non-power feeding mode is entered in which the power transmitter 100 delivers no electric power, the capacitances of the primary capacitor 114 and the tertiary capacitor 314 may be set to values lower than those given by Eqs. (1) and (2). This increases the value of the input impedance Zin to decrease the standby current I1s expressed by Eq. (14) and the standby current I3s expressed by Eq. (15).

Figure 10:
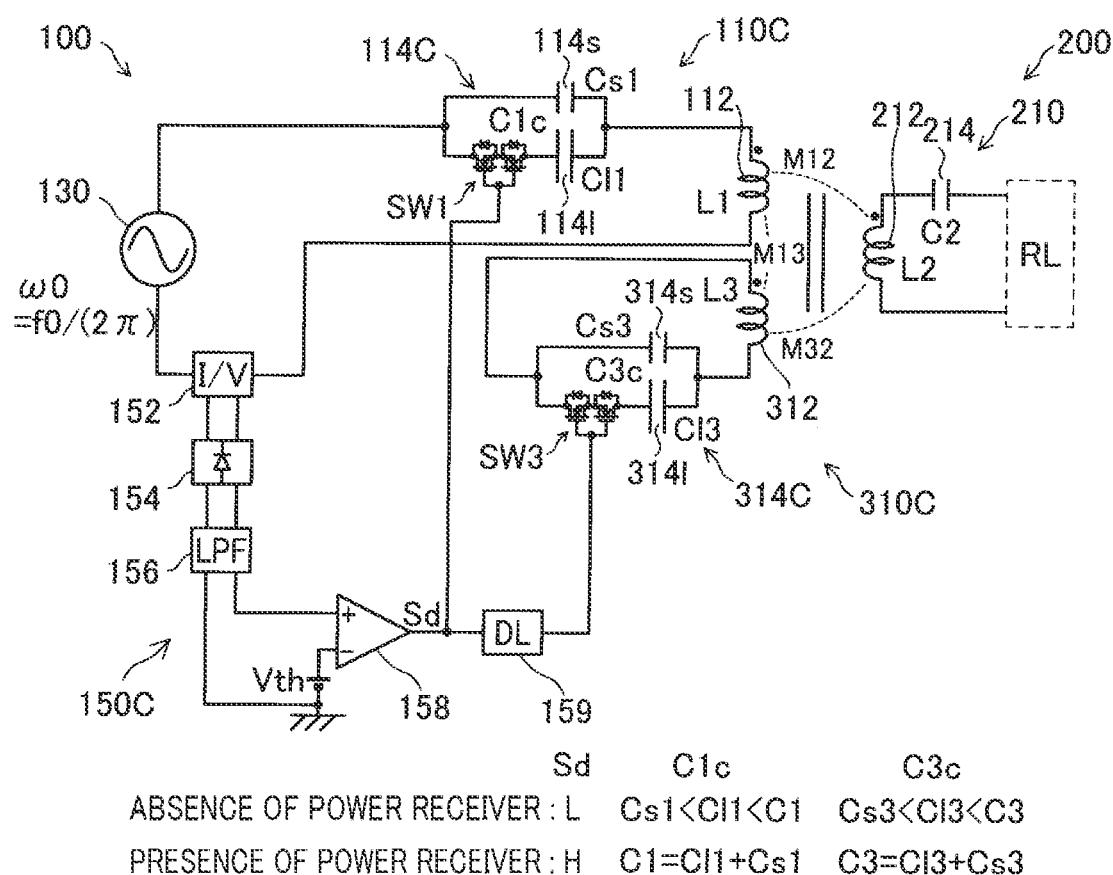
FIG. 10 is a schematic view which illustrates a structure of a wireless power transmission system in the fifth embodiment.

The wireless power transmission system illustrated in FIG. 10 is equipped with the primary resonant circuit 110C and the tertiary resonant circuit 310C instead of the primary resonant circuit 110 and the tertiary resonant circuit 310 shown in FIG. 1 and also includes the power receiver detecting circuit 150C.

The primary resonant circuit 110C includes the primary capacitor 114C instead of the primary capacitor 114 (see FIG. 1). The primary capacitor 114C is made of a variable capacitor designed to have a variable capacitance. The primary capacitor 114C is made of a unit consisting of the first capacitor 114*l*, the bidirectional switch SW1 connected in series with the first capacitor 114*l*, and the second capacitor 114*s* arranged in parallel to the first capacitor 114*l* and the bidirectional switch SW1. The second capacitor 114*s* has the capacitance Cs1 lower than the capacitance Cl1 of the first capacitor 114*l*. The first capacitor 114*l* connects with the second capacitor 114*s* in parallel thereto when the bidirectional switch SW1 is turned on or alternatively disconnects from the second capacitor 114*l* when the bidirectional switch SW1 is turned off. The capacitance C1c of the primary capacitor 114C will, therefore, be the capacitance Cs1 of the second capacitor 114*s* when the bidirectional switch SW1 is in the off-state or alternatively be the sum of the capacitance Cl1 of the first capacitor 114*l* and the capacitance Cs1 of the second capacitor 114*s* when the bidirectional switch SW1 is in the on-state (i.e., Cl1+Cs1).

Similarly, the tertiary resonant circuit 310C includes the tertiary capacitor 314C instead of the tertiary capacitor 314 (see FIG. 1). The tertiary capacitor 314C is made of a variable capacitor having a variable capacitance. The tertiary capacitor 314C is made of a unit consisting of the first capacitor 314*l*, the bidirectional switch SW3 connects with the first capacitor 314*l* in series therewith, and the second capacitor 314*s* arranged in parallel to the first capacitor 314*l* and the bidirectional switch SW3. The capacitance Cs3 of the second capacitor 314*s* is lower than the capacitance Cl3 of the first capacitor 314*l*. The first capacitor 314*l* connects with the second capacitor 314*s* in parallel therewith when the bidirectional switch SW3 is turned on or alternatively disconnects from the second capacitor 314*s* when the bidirectional switch SW3 is turned off. The capacitance C3c of the tertiary capacitor 314C will, therefore, be the capacitance Cs3 of the second capacitor 314*s* when the bidirectional switch SW3 is in the off-state or alternatively be the sum of the capacitance Cl3 of the first capacitor 314*l* and the capacitance Cs3 of the second capacitor 314*s* when the bidirectional switch SW3 is in the on-state (i.e., Cl3+Cs3).

The capacitance Cs1 of the second capacitor 14*s* of the primary capacitor 114C and the capacitance Cs3 of the second capacitor 314*s* of the tertiary capacitor 314C may only need to be low values which set the standby current I1s in Eq. (14) and the standby current I3s in Eq. (15) to required values. The capacitance Cl1 of the first capacitor 114*l* of the primary capacitor 114C may only need to be determined so that a value of [Cl1+Cs1] is equal to the capacitance C1 given by Eq. (1). Additionally, the capacitance Cl3 of the first capacitor 314*l* of the tertiary capacitor 314C may only need to be determined so that a value of [Cl3+Cs3] as equal to the capacitance C3 given by Eq. (2).

The power receiver detecting circuit 150C is equipped with the delay circuit 159 which works to delay the detection signal Sd in time which is outputted from the comparator 158. The detection signal Sd which is outputted from the comparator 158 is inputted in the form of a switching signal to the bidirectional switch SW1 of the primary capacitor 114C. the detection signal Sd which is delayed in time is inputted in the form of a switching signal to the bidirectional switch SW3 of the tertiary capacitor 314C.

When it is required to transfer electric power from the power transmitter 100, that is, a power-feeding mode is entered, the detection signal Sd is changed to the H-level to turn on the bidirectional switches SW1 and SW3, thereby causing the capacitance C1c of the primary capacitor 114C to be set to the capacitance C1 given by Eq. (1) and the capacitance C3c of the tertiary capacitor 314C to be set to the capacitance C3 given by Eq. (2). This places the wireless power transmission system in an activated state, like in the first embodiment.

When the non-power feeding mode is entered, the detection signal Sd is changed to the L-level to turn off the bidirectional switches SW1 and SW3, thereby causing the capacitance C1c of the primary capacitor 114C to be set to the capacitance Cs1 which is lower than the capacitance C1 and the capacitance C3c of the tertiary capacitor 314C to be set to the capacitance Cs3 which is lower than the capacitance C3. This decreases the standby current I1 in Eq. (14) and the standby current I3 in Eq. (15), thereby minimizing an undesirable loss of electric power arising from flow of a large amount of the standby current I1s. The control of operation of the alternating-current source 130 which has been described in the fourth embodiment may be omitted. This embodiment is also capable of decreasing a leakage of magnetic flux arising from the flow of the standby currents I1s and I3s, As apparent from the above discussion, the power receiver detecting circuit 150C serves as a capacitance controller to change the capacitances of the primary capacitor 114C and the tertiary capacitor 314C.

The capacitance C1c of the primary capacitor 114C in the power-feeding mode may be set to a relatively low value because it, as can be seen in Eq. (1), needs to resonate with the self-inductance of the primary coil 112. Accordingly, each of the capacitance C11 of the first capacitor 14*l* and the capacitance Cs1 of the second capacitor 114*s* used in the primary capacitor 114C may be set to a relatively low value, thereby enabling such capacitors to be reduced in size. The same is true for the capacitance of the tertiary capacitor 314.

The capacitance C1c of the primary capacitor 114C, the capacitance C2 of the secondary capacitor 214, and the capacitance C3c of the tertiary capacitor 314C may be determined according to Eqs. (Rf1), (Rf2), and (Rf3) below which are well known in the art.

$$C1 = \frac{1}{\omega 0^2 \cdot L1\left(1 - \frac{k13}{k32}k12\right)} \quad \text{(Rf1)}$$

$$C2 = \frac{1}{\omega 0^2 \cdot L2\left(1 - \frac{k32}{k13}k12\right)} \quad \text{(Rf2)}$$

$$C3 = \frac{1}{\omega 0^2 \cdot L3} \quad \text{(Rf3)}$$

In Eq. (Rf1), the calculation of the capacitance C1c of the primary capacitor 114C is achieved by multiplying a value in a denominator by (1−k13·k12/k32) derived using a coupling coefficient, thus resulting in the value of the capacitance C1c greater than that derived using Eq. (1). In the non-power feeding mode in which the power transmitter 100 delivers no electric power to the power receiver 200, a target value of the capacitance of a capacitor required to decrease electrical current flowing through the primary coil 112 to a selected value is constant. A range of change in capacitance C1c required to decrease the above electrical current to a given value in the non-power feeding mode may, therefore, be decreased to be smaller when the capacitance C1c is set to a small value using Eq. (1) than that when the capacitance C1c is set to a great value using Eq. (Rf1). For this reason, this embodiment uses Eq. (1) to determine the capacitance C1c, thereby enabling the primary capacitor 114C working as a variable capacitor to be reduced in size.

The reason that after the detection signal Sd is delayed in time to change the capacitance C1c of the primary capacitor 114C, the capacitance C3c of the tertiary capacitor 314C is changed is because the current flowing through the primary coil 112 has been decreased at a time when the detection signal Sd is changed to the L-level, so that switching of the bidirectional switch SW1 of the primary capacitor 114C at that time will result in a decreased risk that a high level of surge voltage may be generated by the switching of the bidirectional switch SW1, and the current flowing through the tertiary coil 312 usually decreases with a decrease in the capacitance C1c of the primary capacitor 114C, so that the switching of the bidirectional switch SW3 of the tertiary capacitor 314C will also result in a decreased risk that a high level of surge voltage may be generated by the switching of the bidirectional switch SW1. In a case where the above generation of surge voltage is permissible in the system, the delay circuit 159 may be omitted.

Figure 11:
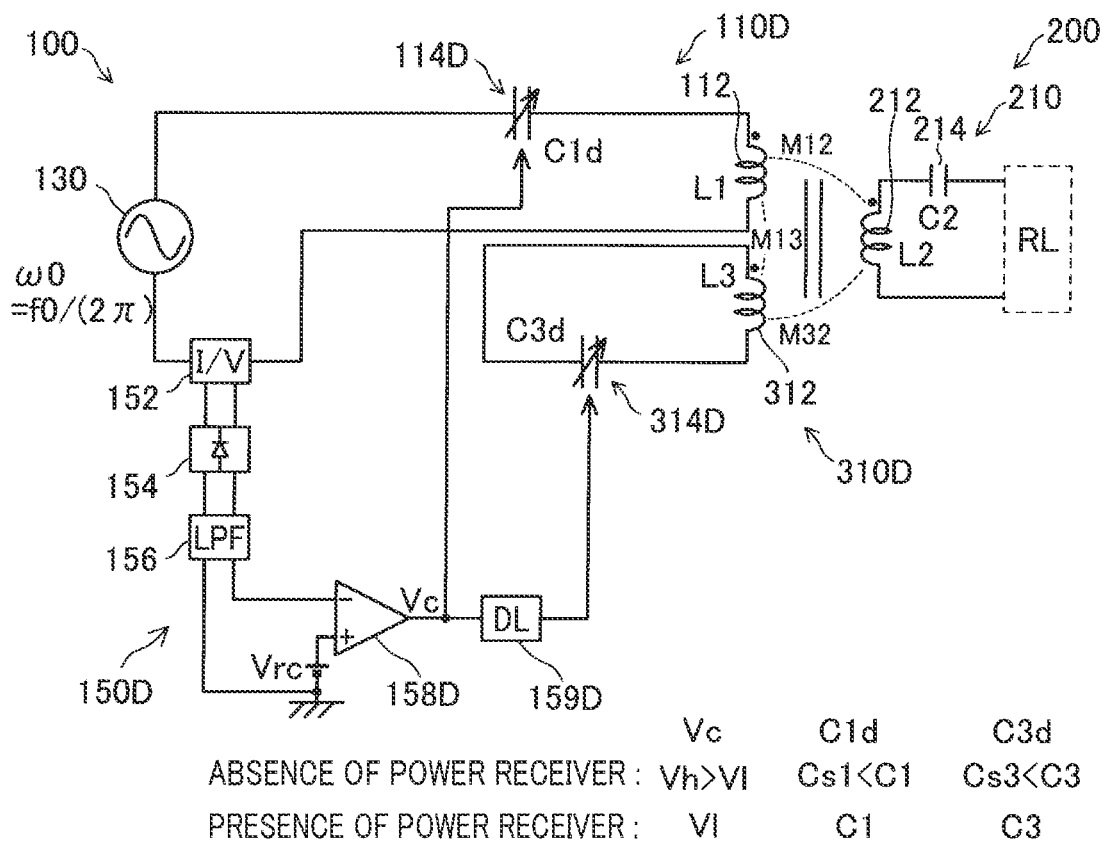
FIG. 11 is a schematic view which illustrates a modified structure of a wireless power transmission system in the fifth embodiment.

The wireless power transmission system illustrated in FIG. 11 includes the primary resonant circuit 110D and the tertiary resonant circuit 310D instead of the primary resonant circuit 110C and the tertiary resonant circuit 310C illustrated in FIG. 10 and also includes the power receiver detecting circuit 150D instead of the power receiver detecting circuit 150C illustrated in FIG. 10.

The primary resonant circuit 110D uses the primary capacitor 114D that is a variable capacitor to variably change the capacitance C1d as a function of a control input in the form of the control voltage Vc. Similarly, the tertiary resonant circuit 310D uses the tertiary capacitor 314D that is a typical variable capacitor to vary the capacitance C3d as a function of the control voltage Vc.

The power receiver sensing circuit 150D is equipped with the voltage conversion circuit 158D in connection with the primary capacitor 114D and the tertiary capacitor 314D. The voltage conversion circuit 158D is used as the comparator 158 of the power receiver sensing circuit 150C in the structure illustrated in FIG. 10. The voltage conversion circuit 158D is made of a differential amplifier circuit working to output the control voltage Vc as a function of a difference between the above-described detection voltage and the reference voltage Vrc. The delay circuit 159D is also provided which is used as the delay circuit 159 in the structure of FIG. 10. The delay circuit 159D works to delay the variable control voltage Vc in time.

The variable capacitors used as the primary capacitor 114D and the tertiary capacitor 314D are designed to have capacitances decreasing with an elevation in level of the control voltage Vc. The control valve Vc outputted from the voltage conversion circuit 158D needs to be controlled to be the voltage Vl in the power feeding mode which is developed in a condition where C1d=C1 and C3d=C3 and alternatively be the voltage Vh(>Vl) in the non-power feeding mode in a condition where C1d=Cs1(<C1) and C3d=Cs3 (<C3). In order to meet such a need, the voltage conversion circuit 158D is made of a differential amplifier circuit configured to have input of the detection voltage to an inverting input terminal (−) thereof and output the control voltage Vc which decreases with an elevation in level of the detection voltage derived by the current measuring circuit 152. The variable capacitors (i.e., the primary capacitor 114D and the tertiary capacitor 314D) may alternatively be designed to have characteristics inverse of those described above. In such a case, the voltage conversion circuit 158D is designed to have the detection voltage inputted to a non-inverting input terminal (+) thereof.

The wireless power transmission system in FIG. 11, like that in FIG. 10, operates in the same way as in the first embodiment in the power feeding mode. The wireless power transmission system is also capable of reducing a loss of electric power arising from flow of a large amount of the standby current I1s in the non-power feeding mode. The control of operation of the alternating-current source 130 described in the fourth embodiment may be omitted. The risk that the leakage of magnetic flux may result from flow of the standby currents I1s and I3s may be eliminated.

The capacitance C1d of the primary capacitor 114D in the power feeding mode may be determined, like the capacitance C1c of the primary capacitor 114c, to be relatively low. This reduces a range of change in the capacitance C1 in either of the power feeding mode and the non-power feeding mode, thereby facilitating use of a variable capacitor as the primary capacitor 114D which has a capacitance variable as a function of the control input (i.e., the control valve Vc).

As apparent from the above discussion, the power receiver sensing circuit 150D works as a capacitance controller to change the capacitances of the primary capacitor 114D and the tertiary capacitor 314D.

In the structures of FIGS. 10 and 11, the primary capacitors 114C and 114D of the primary resonant circuits 110C and 110D and the tertiary capacitors 314C and 314D of the tertiary resonant circuits 310C and 310D are, as described above, made of variable capacitors, but however, only each of the tertiary resonant circuits 310C and 310D may alternatively be made of a non-variable capacitor having a constant capacitance. In this structure, it is impossible to control the leakage of magnetic flux arising from the standby current I3s, but however, it is possible to minimize a loss of electric power and leakage of magnetic flux resulting from flow of the standby current I1s.

The above-described fifth embodiment is a modification of the structure in the first embodiment (see FIG. 1), but however, may alternatively designed to have a modified structure in the third embodiment (see FIG. 6).

F. Sixth Embodiment

The determination of circuit constants of each circuit installed in the wireless power transmission system is usually achieved based in a design condition where the primary coil 112 and the secondary coil 212 face each other (see FIGS. 1 and 6), specifically, the primary coil 112 and the secondary coil 212 are oriented to have central axes thereof aligned with each other. In contrast, the determination of the capacitance of the secondary capacitor 214 to provide an enhanced power factor of ac power described in the first and third embodiments is preferably achieved in a design condition which will be described below in detail.

Figure 12:
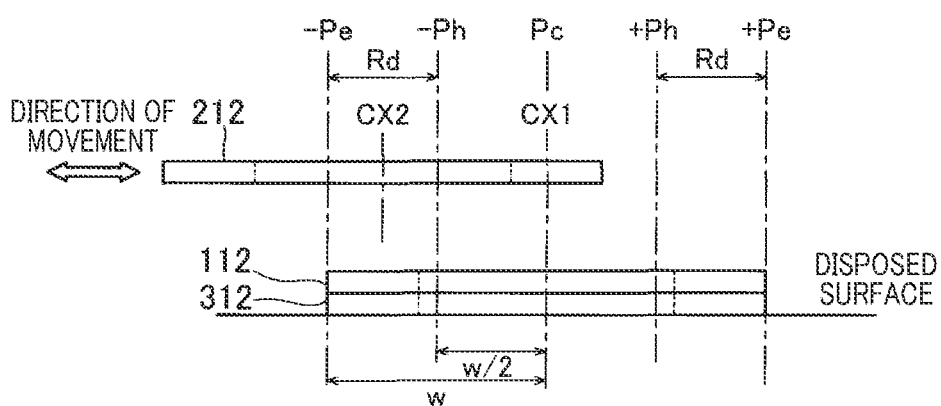
FIG. 12 is an explanatory view which represents a first design condition for use in determining circuit constants in a wireless power transmission system.

The following discussion on an example illustrated in FIG. 12 assumes that the secondary coil 212 moves closer to and then away from the primary coil 112. A design condition may be considered in which the center axis CX2 of the secondary coil 212 is located in one of regions Rd defined between a position −Ph and a coil end position −Pe and between a position +Ph and a coil end position +Pe in a direction in which the secondary coil 212 moves. The coil ends −Pe and +Pe represent ends of the primary coil 112 which are opposed to each other in the direction of movement of the secondary coil 212. Each of the positions −Ph and +Ph is a position which is one-haft of an interval between the center position Pc (i.e., position of the center axis CX1) of the primary coil 112 and a corresponding one of the coil ends −Pe and +Pe away from a corresponding one of the coil ends −Pe and +Pe in the direction of movement of the secondary coil 212. Such a design condition will also be referred to as a first design condition below.

Figure 13:
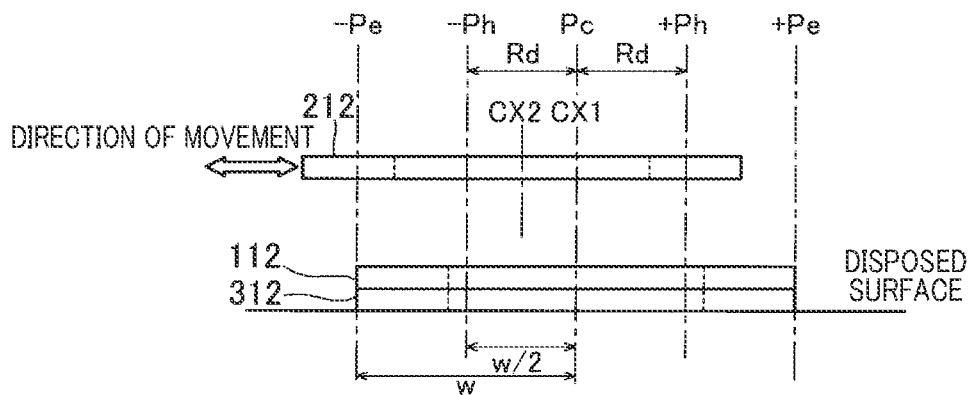
FIG. 13 is an explanatory view which represents a second design condition for use in determining circuit constants in a wireless power transmission system.

Additionally, another design condition demonstrated in FIG. 13 may be considered in which the center (i.e., the center axis) of the secondary coil 212 is arranged on one of regions Rd between the center position Pc (i.e., position of the center axis CX1) of the primary coil 112 and the position −Ph and between the center position Pc and the position +Ph in the direction in which the secondary coil 212 moves. Each of the positions −Ph and +Ph is, as described above, a position which is one-half of an interval between the center position Pc of the primary coil 112 and a corresponding one of the coil ends −Pe and +Pe away from the center position Pc in the direction of movement of the secondary coil 212. Such a design condition will also be referred to as a second design condition below.

Figure 14:
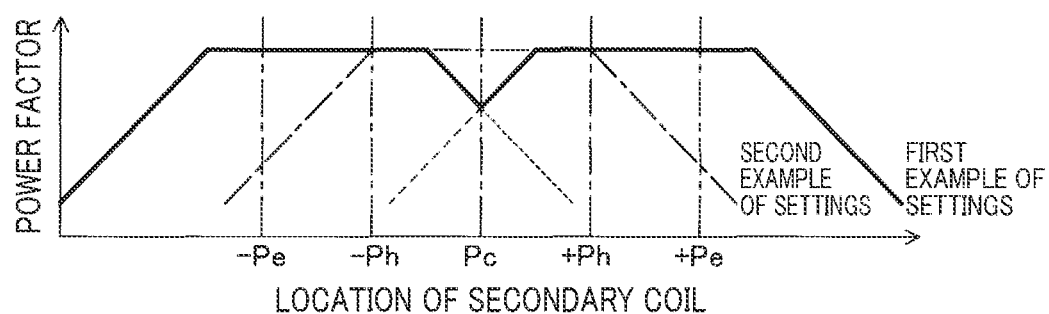
FIG. 14 is an explanatory view which represents relations between design conditions and power factors.

FIG. 14 represents a comparison between power factors in a second setting example in the second design condition and in a first setting example in the first design condition. The first setting example is an example of the first design condition where an intermediate position between the coil end −Pe of the primary coil 112 and the ½ position −Ph coincides with the center position of the secondary coil 212. The second setting example is an example of the second design condition where the center position Pc of the primary coil 112 coincides with the center position of the secondary coil 212.

In the second setting example, the power factor decreases as the center position of the secondary coil 212 moves away from a design point, that is, the center position Pc of the primary coil 112. In contrast, in the first setting example, the power factor slightly drops near the center position Pc of the primary coil 112, but is substantially kept constant over a wide range. It, therefore, follows that in order to ensure a high level of the power factor over an increased range in addition to a condition where the major surface of the primary coil 112 faces that of the secondary coil 212, the wireless power transmission system is preferably designed to satisfy the first design condition.

Figure 15:
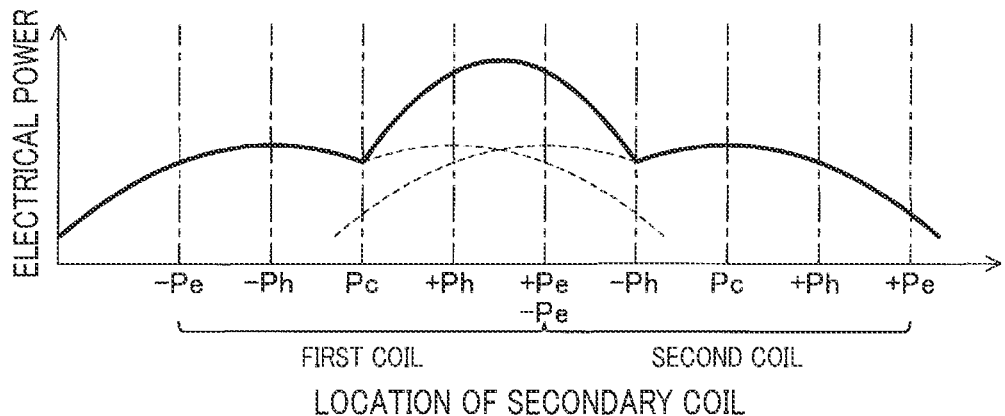
FIG. 15 is an explanatory view which demonstrates a pulsation of electric power in a first design condition.
Figure 16:
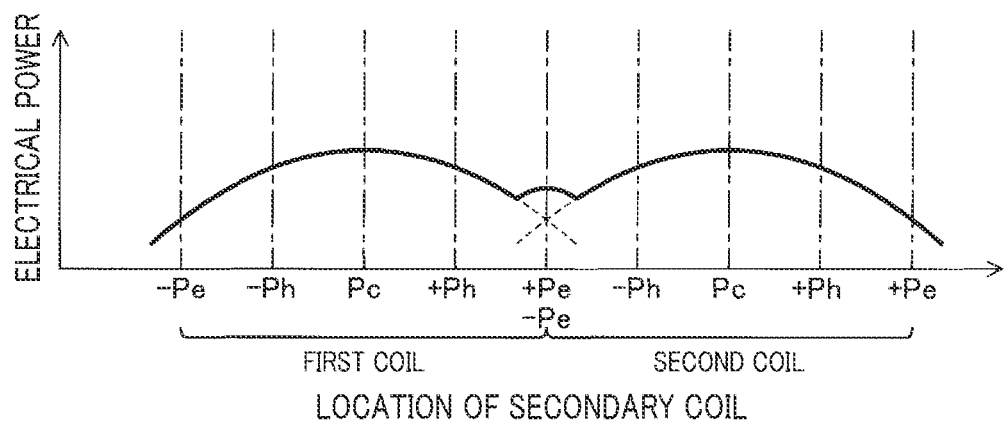
FIG. 16 is an explanatory view which demonstrates a pulsation of electric power in a second design condition.

Although not illustrated, when a plurality of primary coils 112 are arrayed in the direction of movement of the primary coils 112 (see FIGS. 12 and 13), the wireless power transmission system is preferably configured to meet the second design condition, not the first design condition. If the wireless power transmission system is designed to meet the first design condition, electric powers transferred from the first coil and the second coil that are ones of the primary coils 112, as demonstrated in FIG. 15, may overlap each other in a region around adjacent ends +Pe and −Pe of the first and second coils, thereby resulting in an increase in pulsation of the electric powers. In contrast, if the wireless power transmission system is designed to meet the second design condition, it, as can be seen in FIG. 16, results in a decreased overlap between electric powers delivered from the first and second coils located adjacent to each other, thus reducing the pulsation of the electric powers.

G. Seventh Embodiment

The wireless power transmission system in each of the above embodiments is equipped with a single pair of the primary resonant circuit and the tertiary resonant circuit, but however, may alternatively be designed to have a plurality of power transmitting units each of which includes a single pair of a primary resonant circuit and a tertiary resonant circuit in the way as described below.

Figure 17:
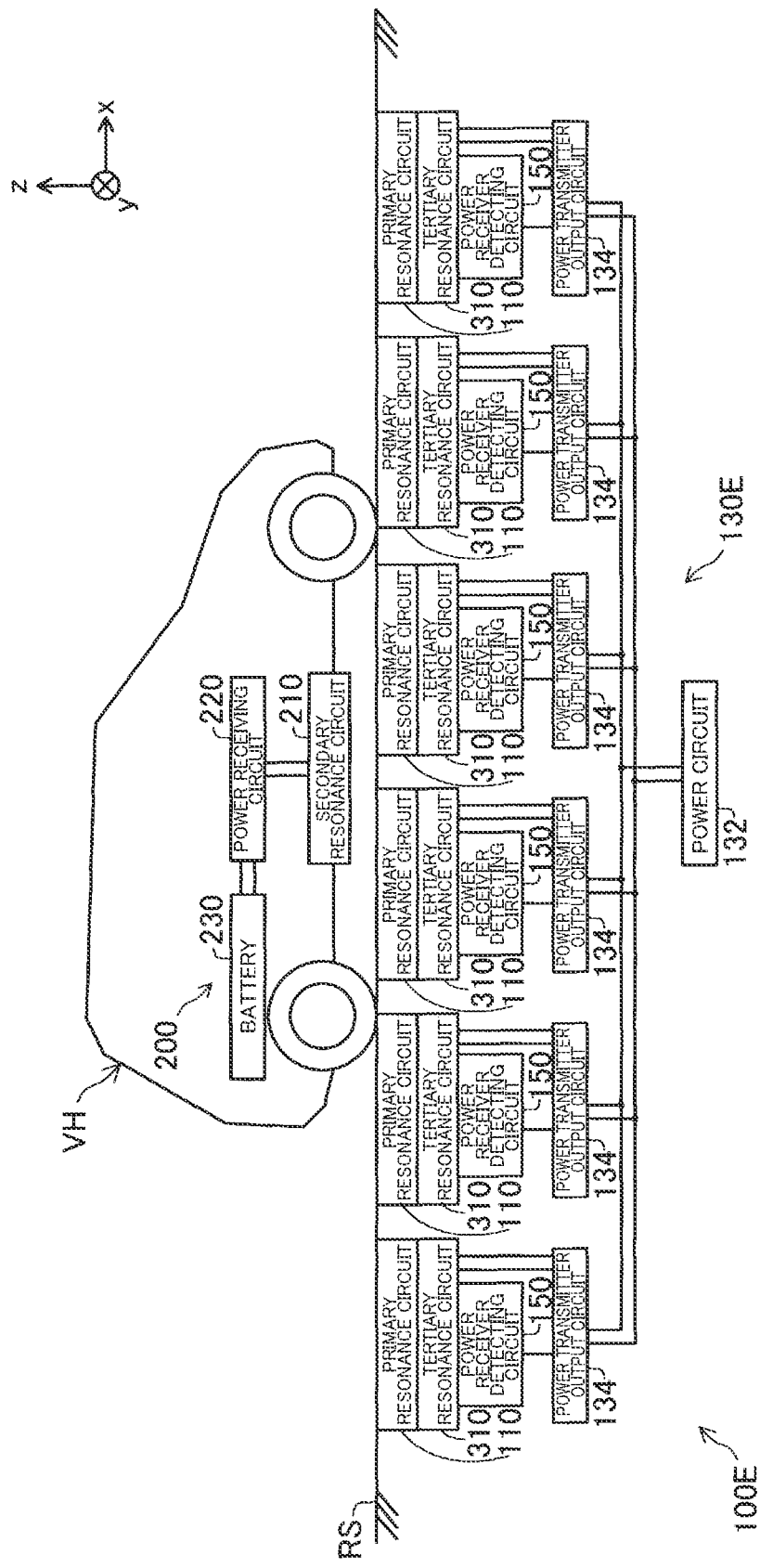
FIG. 17 is a schematic view which illustrates a structure of a wireless power transmission system designed for use in automotive vehicles.

For instance, the wireless power transmission system may be designed to have a structure, as illustrated in FIG. 17, for use in automotive vehicles. The wireless power transmission system in FIG. 17 is equipped with a plurality of power transmitting units each of which includes the primary resonant circuit 110, the tertiary resonant circuit 310, and the power receiver sensing circuit 150 illustrated in FIG. 9. The wireless power transmission system in FIG. 17 is configured as a power feeding system which works to transfer electric power from the power transmitter 100E disposed on or in a lane of the vehicle traffic road RS to the power receiver 200 (see FIG. 9) installed in the vehicle VH. The vehicle VH is implemented by an electric vehicle or a hybrid vehicle using electric power as traction power. In FIG. 17, the x-axis indicates a direction of forward movement of the vehicle VH along the lane of the vehicle traffic road RS. The y-axis indicates a width direction of the vehicle traffic road RS. The z-axis indicates a vertical direction. The same definition of the x-, y-, and z-axes applies to the following drawings.

The power transmitter 100E is equipped with a plurality of power transmitting units each of which includes the primary resonant circuit 110, the tertiary resonant circuit 310, and the power receiver sensing circuit 150 illustrated in FIG. 9. The power transmitter 100E also includes the alternating-current source 130E. The alternating-current source 130E includes the power circuit 132 and a plurality of power transmission output circuits 134 which apply electric power to the primary resonant circuits 110.

The primary coils 112 (see FIG. 9) of the primary resonant circuits 110 are arranged away from each other along the lane of the vehicle traffic road RS. The tertiary coil 312 of each of the tertiary resonant circuits 310 is stacked on a corresponding one of the primary coils 112 (see FIGS. 4 and 5).

The power circuit 132 works to convert ac power delivered from an external power supply into dc power. Each of the power transmission output circuits 134 includes an inverter which converts the dc power supplied from the power circuit 132 into ac power at the operating frequency. Each of the power transmission output circuits 134 is controlled in operation by a corresponding one of the power receiver sensing circuits 150.

The power receiver 200 mounted in the vehicle VH includes the secondary resonant circuit 210, the power receiving circuit 220, and the battery 230 (see FIG. 9). The secondary coil 212 of the secondary resonant circuit 210 is arranged on the bottom of the vehicle VH, so that it may face the primary coil 112 of one of the primary resonant circuits (see FIG. 4). The electric power induced in the secondary resonant circuit 210 is used to charge the batter 230 through the power receiving circuit 220 for driving an electric motor, not shown.

Each of the power receiver sensing circuits 150, as described in the fourth embodiment with reference to FIG. 9, works to detect the presence of the secondary coil 212 to which it is required to transfer electric power from the primary coil 112, in other words, the presence of the vehicle VH in which the power receiver 200 is mounted. When detecting the presence of the vehicle VH, each of the power receiver sensing circuits 150 actuates a corresponding one of the power transmission output circuits 134 to apply electric power to a corresponding one of the primary resonant circuits 110 to transfer the electrical energy to the power receiver 200 of the vehicle VH. When detecting the absence of the vehicle VH, each of the power receiver sensing circuits 150 deactivates a corresponding one of the power transmission output circuits 134.

The wireless power transmission system in this embodiment offers substantially the same beneficial advantages as in the above embodiments.

When there is no need to implement measures to deal with loss of electric power or leakage of magnetic flux, the power receiver sensing circuits 150 may be omitted, and the power transmission output circuits 134 may be kept on at all times. In a case where the input impedance Zin of the primary resonant circuit 100 is, as described in the second embodiment, increased, thus resulting in an increase in drop in current flowing through the primary resonant circuit 110 in the absence of the secondary coil 212, the power receiver sensing circuits 150 may be omitted. In such a case, the wireless power transmission system may be designed to a single power transmission output circuit 134.

Figure 18:
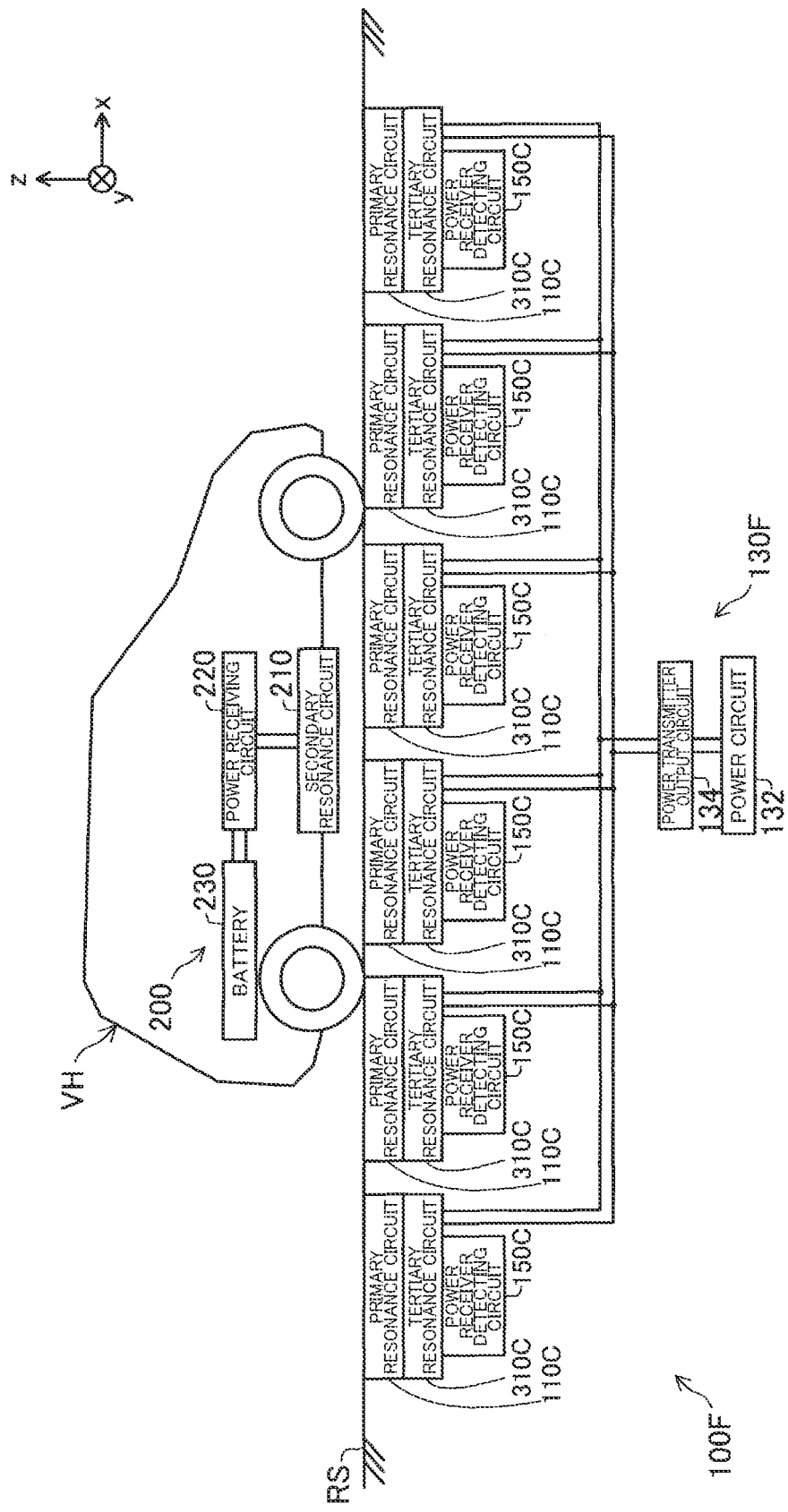
FIG. 18 is a schematic view which illustrates another structure of a wireless power transmission system designed for use in automotive vehicles.

The wireless power transmission system may be designed for the vehicle VN to have a structure illustrated in FIG. 18 which is equipped with a plurality of power transmitting units each of which includes the primary resonant circuit 110C, the tertiary resonant circuit 310C, and the power receiver sensing circuit 150C illustrated in FIG. 10. The wireless power transmission system in FIG. 18 is configured as a power feeding system which works to transfer electric power from the power transmitter 100F disposed on or in the lane of the vehicle traffic road RS to the power receiver 200 (see FIG. 10) installed in the vehicle VH.

The power transmitter 100F is equipped with a plurality of power transmitting units each of which includes the primary resonant circuit 110C, the tertiary resonant circuit 310C, and the power receiver sensing circuit 150C illustrated in FIG. 10. The power transmitter 100F is equipped with the alternating-current source 130F. The alternating-current source 130F is, unlike the alternating-current source 130E in FIG. 17, equipped with a single power transmission output circuit 134.

The primary coils 112 (see FIG. 10) of the primary resonant circuits 110C are, like the primary resonant circuits 110 in FIG. 17, arranged away from each other along the lane of the vehicle traffic road RS. The tertiary coil 312 of each of the tertiary resonant circuits 310C is, like the tertiary resonant circuits 310 in FIG. 17, stacked on a corresponding one of the primary coils 112 (see FIGS. 4 and 5).

The structure of the power receiver 200 installed in the vehicle VH is the same as in the wireless power transmission system illustrated in FIG. 17.

Each of the power receiver sensing circuits 150C, as described in the fifth embodiment with reference to FIG. 10, works to detect the presence of the secondary coil 212 to which it is required to transfer electric power from the primary coil 112, in other words, the presence of the vehicle VH in which the power receiver 200 is mounted. When detecting the presence of the vehicle VH, each of the power receiver sensing circuits 150C changes the capacitance of the primary capacitor 114C of a corresponding one of the primary resonant circuits 110C to a capacitance used in the power feeding mode. The power transmission output circuit 134 then applies electric power to the primary resonant circuit 110C equipped with the primary capacitor 114C whose capacitance has been changed to that used in the power feeding mode, thereby transferring electrical energy to the power receiver 200 installed in the vehicle VH. When detecting the absence of the vehicle VH, each of the power receiver sensing circuits 150C changes the capacitance of the primary capacitor 114C of a corresponding one of the primary resonant circuits 110C to a capacitance used in the non-power feeding mode. This results in an increase in the input impedance Zin of the primary resonant circuit 110C equipped with the primary capacitor 114C whose capacitance has been changed to that used in the non-power feeding mode, thereby outputting no electric power to a corresponding one of the primary resonant circuits 110C. In other words, the wireless power transmission system works to supply current only to the primary resonant circuit 110C equipped with the primary capacitor 114C regulated to have the capacitance set for use in the power feeding mode without supplying current to the primary resonant circuits 110C equipped with the primary capacitors 114C regulated to have the capacitances set for use in the non-power feeding mode. This minimizes a useless loss of electric power. As apparent from the above discussion, the wireless power transmission system in this embodiment is designed to use the single power transmission output circuit 134 to operate the plurality of primary resonant circuits 110C.

The wireless power transmission system in this embodiment offers substantially the same beneficial advantages as in the above embodiments.

Although not illustrated and described in detail, the wireless power transmission system for vehicles may be designed to include a plurality of primary resonant circuits 110D, a plurality of tertiary resonant circuits 310D, and a plurality of power receiver sensing circuits 150D.

The above-described wireless power transmission systems for vehicles illustrated in FIGS. 17 and 18 are designed to use the structure in the first embodiment (see FIG. 1), but however, may alternatively be constructed to use the structure in the third embodiment (see FIG. 6).

The above-described the wireless power transmission system designed for vehicles which includes the power transmitting units each of which the primary resonant circuit and the tertiary resonant circuit offers substantially the same beneficial advantages as those in the above embodiments.

This disclosure is not limited to the above embodiments, but may be realized by various embodiments without departing from the purpose of the disclosure. For instance, technical features described in the embodiments which correspond to those referred to in the summary of the invention may be replaced with each other or combined in different ways in order to solve at least a portion of the problems or ensure at least a portion of the beneficial effects. The technical features may be omitted unless otherwise they are stated as being essential in in principle.

What is claimed is:

1. A wireless power transmission system which works to supply electric power wirelessly from a power transmitter to a power receiver, comprising:

a power transmitter which includes a primary resonant circuit and an alternating-current source, the primary resonant circuit including a primary coil and a primary capacitor for use in power transmission, the alternating-current source working to apply ac power at a given operating frequency to the primary resonant circuit;

a power receiver which includes a secondary resonant circuit, the secondary resonant circuit including a secondary coil and a secondary capacitor for use in a power reception, the secondary coil being to be magnetically coupled with the primary coil; and a tertiary resonant circuit which includes a tertiary coil and a tertiary capacitor, the tertiary coil being arranged to achieve magnetic coupling with the primary coil and the secondary coil, the tertiary capacitor constituting a short-circuit resonant circuit along with the tertiary coil, the primary coil has a self-inductance L1, a capacitance of the primary capacitor is set to a capacitance C1, as given by Eq. (1) below, to cause resonance in the primary capacitor and the primary coil at an angular frequency ω0 that is the operating frequency, $$C1 = \frac{1}{\omega o^2 \cdot L1} \quad (1)$$

the tertiary coil has a self-inductance L3, a capacitance of the tertiary capacitor is set to a capacitance C3, as given by Eq. (2) below, to cause resonance in the tertiary capacitor and the tertiary coil at the operating frequency, $$C3 = \frac{1}{\omega o^2 \cdot L3} \quad (2)$$

a capacitance of the secondary capacitor is determined to decrease a reactive component of the ac power which arises from the self-inductances and mutual inductances of the primary coil, the secondary coil, and the tertiary coil.

2. The wireless power transmission system as set forth in claim 1, wherein the capacitance of the secondary capacitor is set to a value greater than a capacitance C2r given by Eq. (3) below expressed by the self-inductance L2 of the secondary coil and the angular frequency ω0, $$C2r = \frac{1}{\omega 0^2 \cdot L2}. \quad (3)$$

3. The wireless power transmission system as set forth in claim 2, wherein the capacitance of the secondary capacitor is set to a capacitance C2 given by Eq. (4) below expressed by a self-inductance L2 of the secondary coil, a mutual inductance M12 of the primary coil and the secondary coil, a mutual inductance M13 of the primary coil and the tertiary coil, a mutual inductance M32 of the tertiary coil and the secondary coil, and the angular frequency ω0, $$C2 = \frac{1}{\omega 0^2 \left[ L2 - \frac{2 \cdot M12 \cdot M32}{M13} \right]}. \quad (4)$$

4. The wireless power transmission system as set forth in claim 2, wherein the capacitance of the secondary capacitor is set in a range of a value of the capacitance C2 and the value of the capacitance C2+25%, the value of the capacitance C2 being given by Eq. (4) below expressed by a self-inductance L2 of the secondary coil, a mutual inductance M12 of the primary coil and the secondary coil, a mutual inductance M13 of the primary coil and the tertiary coil, a mutual inductance M32 of the tertiary coil and the secondary coil, and the angular frequency ω0, $$C2 = \frac{1}{\omega 0^2 \left[ L2 - \frac{2 \cdot M12 \cdot M32}{M13} \right]}. \quad (4)$$

5. The wireless power transmission system as set forth in claim 2, wherein the tertiary coil connects in series with the primary coil, the tertiary capacitor connects in parallel to the tertiary coil, the capacitance of the secondary capacitor is set to a capacitance C2 given by Eq. (5) below expressed by a self-inductance L2 of the secondary coil, a self-inductance L3 of the tertiary coil, a mutual inductance M12 of the primary coil and the secondary coil, a mutual inductance M13 of the primary coil and the tertiary coil, a mutual inductance M32 of the tertiary coil and the secondary coil, and the angular frequency ω0, $$C2 = \frac{1}{\omega 0^2 \left[ L2 - \frac{2 \cdot M12 \cdot M32}{L3 + M13} - \frac{M32^2 \cdot L3}{(L3 + M13)^2} \right]}. \quad (5)$$

6. The wireless power transmission system as set forth in claim 2, wherein the tertiary coil connects in series with the primary coil, the tertiary capacitor connects in parallel to the tertiary coil, the capacitance of the secondary capacitor is set in a range of a value of the capacitance C2 and the value of the capacitance C2+25%, the value of the capacitance C2 being given by Eq. (5) below expressed by a self-inductance L2 of the secondary coil, a self-inductance L3 of the tertiary coil, a mutual inductance M12 of the primary coil and the secondary coil, a mutual inductance M13 of the primary coil and the tertiary coil, a mutual inductance M32 of the tertiary coil and the secondary coil, and the angular frequency ω0, $$C2 = \frac{1}{\omega 0^2 \left[ L2 - \frac{2 \cdot M12 \cdot M32}{L3 + M13} - \frac{M32^2 \cdot L3}{(L3 + M13)^2} \right]}. \quad (5)$$

7. The wireless power transmission system as set forth in claim 1, wherein the tertiary coil is arranged in a constant state of coupling with the primary coil.

8. The wireless power transmission system as set forth in claim 7, wherein the primary coil and the tertiary coil are formed integrally in a form of a printed circuit board, and the secondary capacitor and the tertiary capacitor are mounted on the printed circuit board.

9. The wireless power transmission system as set forth in claim 7, wherein the primary capacitor is made of a variable capacitor whose capacitance is variable, and further comprising a capacitance controller which works to measure a coil current flowing through the primary coil and changes the capacitance of the primary capacitor as a function of a value of the coil current, the capacitance controller working to set the capacitance of the primary capacitor to a value lower than the value of the capacitance C1 given by Eq. (1) above when the value of the coil current decreases.

10. The wireless power transmission system as set forth in claim 9, wherein the tertiary capacitor is made of a variable capacitor whose capacitance is variable, and the capacitance controller works to decrease a capacitance of the tertiary capacitor to a value lower than the capacitance C3 given by Eq. (2) above.

11. The wireless power transmission system as set forth in claim 10, wherein the capacitance controller decreases the capacitance of the primary capacitor and then decreases the capacitance of the tertiary capacitor.

12. The wireless power transmission system as set forth in claim 7, wherein the secondary coil moves closer to or away from the primary coil, and the capacitance of the secondary capacitor is determined based on a state of coupling between the primary coil and the secondary coil, a state of coupling between the primary coil and the tertiary coil, and a state of coupling between the tertiary coil and the secondary coil in a condition where a center of the secondary coil lies in one of regions between a first coil end of the primary coil and a position which is one-half of an interval between the center of the primary coil and the first coil end away from the first coil end and between a second coil end of the primary coil and a position which is one-half of the interval away from the second coil end in a direction in which the secondary coil moves closer to or away from the primary coil.

13. The wireless power transmission system as set forth in claim 7, wherein the secondary coil moves closer to or away from the primary coil, and the capacitance of the secondary capacitor is determined based on a state of coupling between the primary coil and the secondary coil, a state of coupling between the primary coil and the tertiary coil, and a state of coupling between the tertiary coil and the secondary coil in a condition where a center of the secondary coil lies in one of regions between a center of the primary coil and a position which is one-half of an interval between the center of the primary coil and the first coil end away from the center of the primary coil and between the center of the primary coil and a position which is one-half of the interval away from the center of the primary coil in a direction in which the secondary coil moves closer to or away from the primary coil.

* * * * *